(12) United States Patent
Sun

(10) Patent No.: US 9,127,747 B2
(45) Date of Patent: Sep. 8, 2015

(54) MOORING CHAIN CONNECTING LINK

(71) Applicant: Kanghua Sun, Ventura, CA (US)

(72) Inventor: Kanghua Sun, Ventura, CA (US)

(73) Assignee: BARDEX CORPORATION, Goleta, CA (US)

( * ) Notice: Subject to any disclaimer, the term of this patent is extended or adjusted under 35 U.S.C. 154(b) by 200 days.

(21) Appl. No.: 13/842,881

(22) Filed: Mar. 15, 2013

(65) Prior Publication Data

US 2013/0298521 A1 Nov. 14, 2013

Related U.S. Application Data

(60) Provisional application No. 61/646,190, filed on May 11, 2012.

(51) Int. Cl.
*F16G 15/04* (2006.01)
*F16G 13/12* (2006.01)

(52) U.S. Cl.
CPC ............... *F16G 15/04* (2013.01); *F16G 13/12* (2013.01)

(58) Field of Classification Search
CPC ................................. F16G 13/12; F16G 15/04
USPC ................. 59/78, 85, 86, 80, 88, 93
See application file for complete search history.

(56) References Cited

U.S. PATENT DOCUMENTS

| | | | | | |
|---|---|---|---|---|---|
| 1,836,169 | A | * | 12/1931 | Humphreys et al. | 59/93 |
| 2,877,621 | A | * | 3/1959 | Robbins | 59/88 |
| 3,282,045 | A | * | 11/1966 | Thelan | 59/93 |
| 4,068,467 | A | * | 1/1978 | Schreyer et al. | 59/93 |
| 4,094,141 | A | * | 6/1978 | Rehbein | 59/93 |
| 4,241,575 | A | * | 12/1980 | St. Germain | 59/93 |
| 4,556,246 | A | * | 12/1985 | Millington | 59/93 |
| 4,841,898 | A | | 6/1989 | Ballantyne | |
| 5,275,379 | A | | 1/1994 | McAleer | |
| 5,829,810 | A | * | 11/1998 | Fredriksson | 59/93 |

FOREIGN PATENT DOCUMENTS

| | | |
|---|---|---|
| CA | 1253749 A1 | 5/1989 |
| GB | 1522648 A | 8/1978 |

OTHER PUBLICATIONS

International Search Report and Written Opinion issued Sep. 12, 2013, during examination of International Application No. PCT/US2013/040774.

\* cited by examiner

*Primary Examiner* — David B Jones
(74) *Attorney, Agent, or Firm* — King & Spalding LLP

(57) ABSTRACT

A connecting link assembly for connecting two chain sizes together. The connecting link assembly includes a smaller connecting link assembly sized according to the smaller chain size, a larger connecting link assembly sized according to the larger chain size, and a connecting component. The connecting component is sized and shaped to be accepted by a dual chain wheel.

20 Claims, 26 Drawing Sheets

MOORING CHAIN CONNECTING LINK

CROSS-REFERENCE TO RELATED APPLICATION

This Application claims the benefit of U.S. Provisional Application 61/646,190 filed on May 11, 2012, which is incorporated by reference in its entirety.

TECHNICAL FIELD

The present disclosure relates generally to high strength chains of long lengths and more particularly relates to a connecting link for connecting together two lengths of chain.

BACKGROUND OF THE DISCLOSURE

There are many situations in which long lengths of high strength chains are required. A common situation arises in marine applications, particularly in mooring or anchoring vessels in deep water, typically required in off-shore drilling and production of hydrocarbon. In off-shore drilling operations, floating production, drilling or construction platforms or spar buoys generally are moored in a desired location through the use of chains secured between the platform and anchors on the ocean floor. In a typical installation, the anchor lines are installed by passing a messenger chain or rope from the deck through a chain wheel and out to a pre-installed anchor or mooring on the ocean floor. A connecting link secures the messenger chain to the anchor chain. The messenger chain is then hauled back to the platform, thereby pulling the anchor chain back to the platform as well. Both the messenger chain and anchor chain pass through the same chain wheel.

Since the messenger chain has a lower capacity, it is usually smaller than the anchor chain. Prior art connecting links do not allow for two different sized chains to be interconnected and transitioned through a chain wheel.

BRIEF DESCRIPTION OF THE DRAWINGS

For a more complete understanding of the disclosed methods and apparatuses, reference should be made to the embodiments illustrated in greater detail in the accompanying drawings, wherein:

FIGS. 3A-3J show a side view of the sequential movement of the first chain assembly of FIG. 1 (the first embodiment of the connecting link of the present disclosure coupled with the smaller chain and larger chain) moving through a chain wheel.

Figure 1:
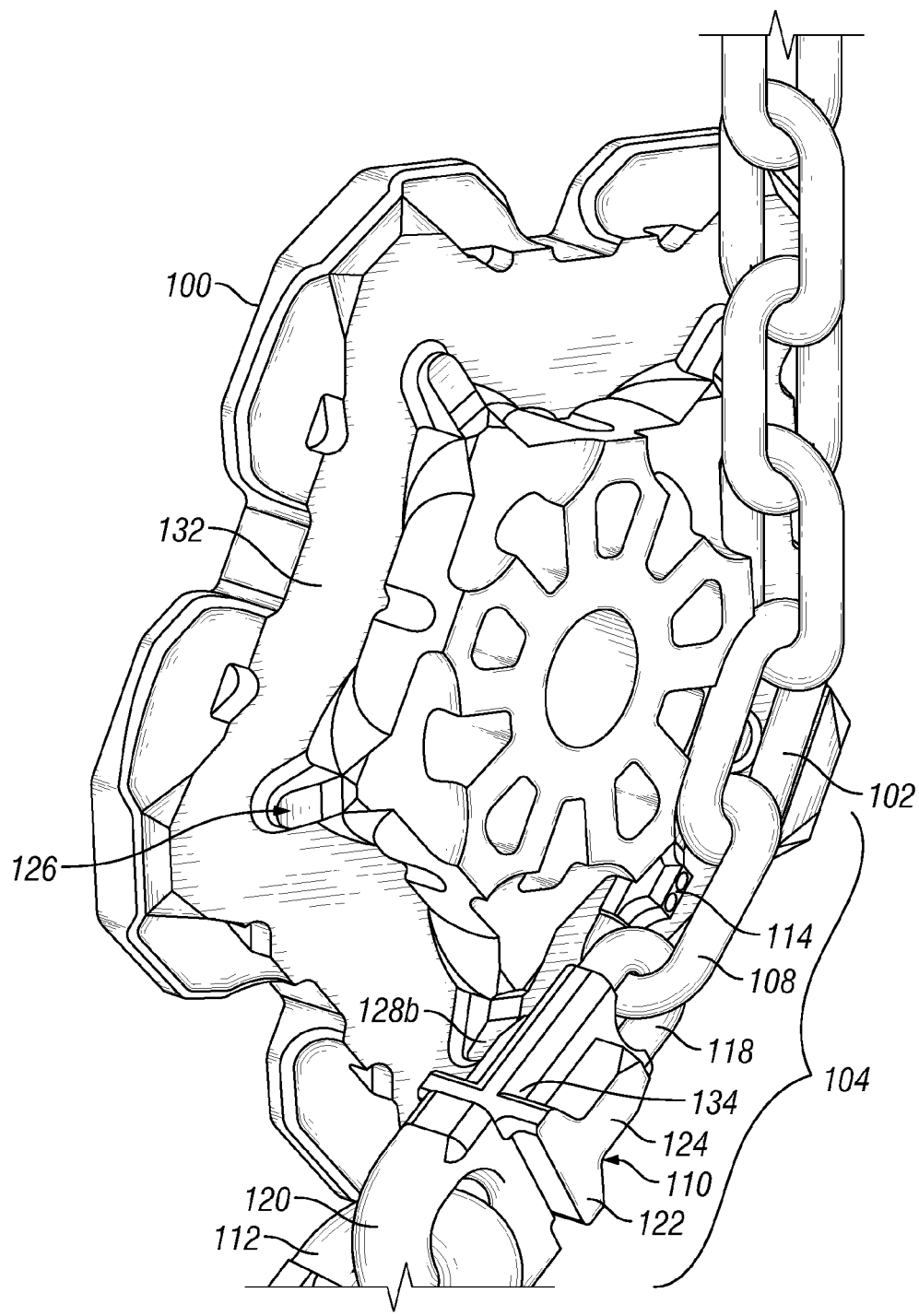
FIG. 1 is a perspective view of a first chain assembly (a first embodiment of a connecting link according to the aspects of the present disclosure coupled with the smaller chain and larger chain) engaged with a chain wheel.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE DISCLOSURE

The connecting link of the present disclosure is generally applicable to many types of chain. In the preferred embodiment, the connecting link of the present disclosure is particularly applicable for connecting heavy-duty chains, such as ships' anchor chains or haulage chains, including chains used in conjunction with chain wheels for transmitting tensional drives.

Further, the connecting link of the present disclosure can generally be used with many types of chain wheels. In the preferred embodiment, the connecting link of the present disclosure is particularly applicable for use with the embodiments of a dual chain wheel disclosed in U.S. Provisional Application 61/555,350, filed on Nov. 3, 2011, the disclosure of which is incorporated herein by reference in its entirety and a copy of which is attached as Exhibit A.

Certain embodiments of the connecting link of the present disclosure allow two different sized chains to be connected with one another in a manner that allows both chains to properly move through a chain wheel, such as that disposed in a fairlead device. Further, certain embodiments of the connecting link of the present disclosure maintain the correct pitch to assure the transition between the smaller chain to the larger chain properly passes around a chain wheel designed for two link sizes. Accordingly, certain embodiments of the connecting link of the present disclosure allows for two different sized chains that are interconnected to transition through a single chain wheel that is configured to accommodate those two chain sizes. Certain embodiments provide a smooth and trouble free transition as the connecting link of the present disclosure is rolled around the chain wheel or fairlead wheel.

In an exemplary embodiment, the smaller chain is a 102 mm chain and the larger chain is a 178 mm chain. The proposed connecting link of this embodiment is designed to fit a 102 mm chain at one end and a 178 mm chain at the opposite end. The connecting link of this embodiment is dimensioned to maintain the proper dimensional length (pitch) so the first 178 mm chain will land in one of the chain wheel pockets for 178 mm chain.

The following paragraphs provide exemplary embodiments of the connecting link of the present disclosure. Referring to FIGS. 1-3J, there is provided a chain assembly engaged with chain wheel 100. The chain assembly comprises smaller chain 102, connecting link assembly 104, and larger chain 106. In the preferred embodiment, connecting link assembly 104 comprises smaller link connecting component 108, dual link connecting component 110, and larger link connecting component 112.

Figure 2:
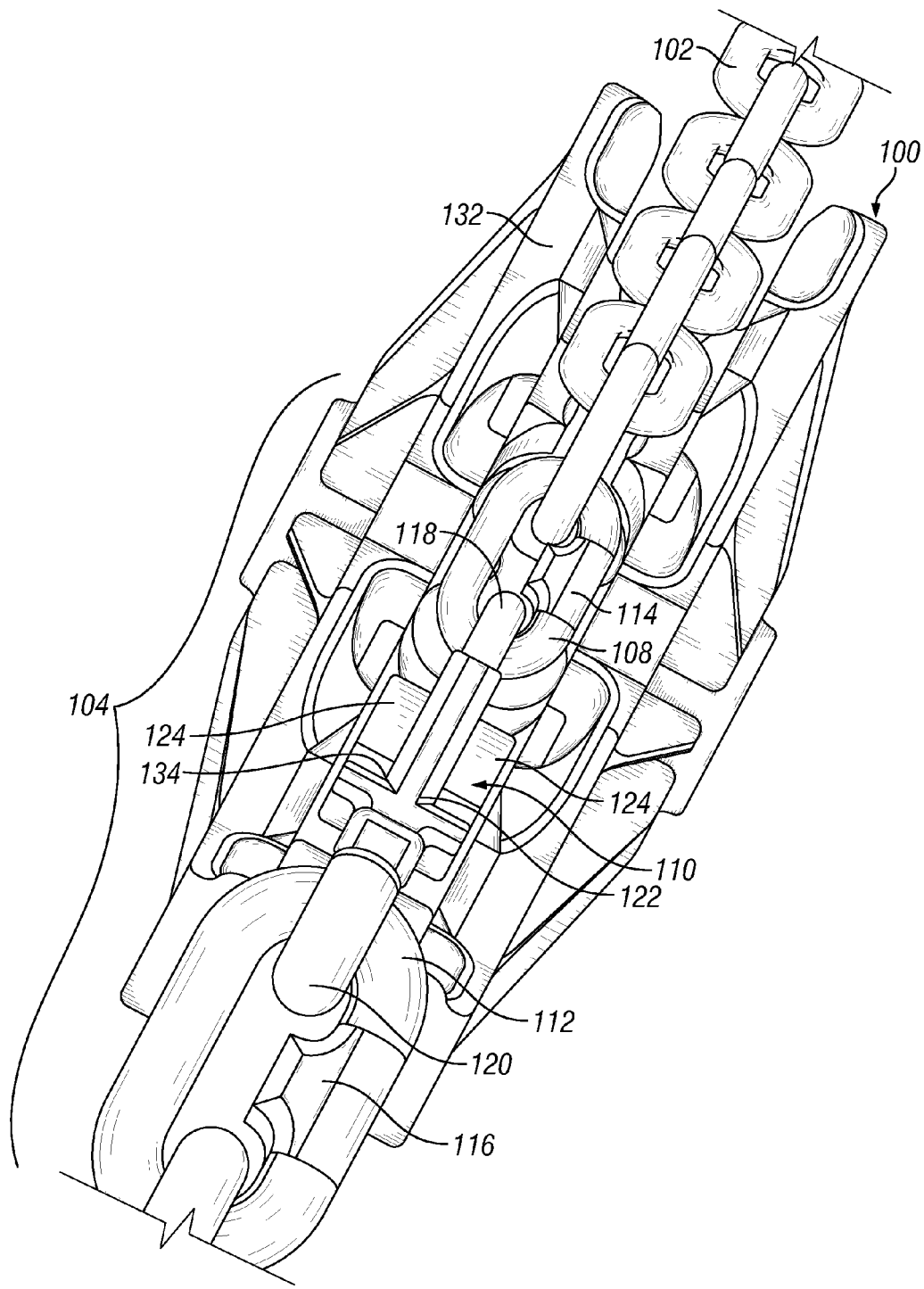
FIG. 2 is a top view of the first chain assembly of FIG. 1 (the first embodiment of the connecting link of the present disclosure coupled with the smaller chain and larger chain) engaged with a chain wheel.

Smaller link connecting component 108 connects smaller chain 102 with smaller end 118 of dual link connecting component 110. Smaller link connecting component 108 preferably has a general shape and size substantially identical to the links of smaller chain 102. In the preferred embodiment, smaller link connecting component 108 is a standard commercial connecting link known to those skilled in the art, which is configured for the particular size of smaller chain 102. Referring to FIGS. 1 and 2, smaller link connecting component 108 further preferably includes release mechanism 114 that is configured to open to allow the end link of smaller chain 102, as well as small end 118 of dual link connecting component 110, to be inserted into the interior of smaller link connecting component 108 and close thereafter to retain the end link of smaller chain 102. In the preferred embodiment, release mechanism 114 is provided by the commercially available standard smaller link connecting component. Typically, release mechanism 114 comprises two halves that can be removed from either side. As shown, release mechanism 114 is disposed on a side of smaller link connecting component. By the virtue of its shape, smaller link connecting component 108 is perpendicular to the end link of smaller chain 102 when coupled to smaller chain 102.

Similarly, larger link connecting component 112 connects larger chain 106 with dual link connecting component 110. Larger link connecting component 112 preferably has a general shape and size substantially identical to the links of larger chain 106. In the preferred embodiment, larger link connecting component 112 is a standard commercial connecting link known to those skilled in the art, which is configured for the particular size of larger chain 106. Referring to FIG. 2, larger link connecting component 112 further preferably includes release mechanism 116 that is configured to open to allow the end link of larger chain 106, as well as large end 120 of dual link connecting component 110, to be inserted into the interior of larger link connecting component 112 and close thereafter to retain the end link of larger chain 106. Release mechanism 116 functions in a similar manner as release mechanism 114. As shown, release mechanism 116 is disposed on a side of larger link connecting component 112. By the virtue of its shape, larger link connecting component 108 is perpendicular to the end link of larger chain 106 when coupled to larger chain 106. Accordingly, smaller link connecting component 108, dual link connecting component 110, and larger link connecting component 112 maintain the desired alternating perpendicular configuration of both smaller chain 102 and larger chain 106 when they are connected with one another.

Referring to FIGS. 1-3J, dual link connecting component 110 preferably has small end 118, large end 120, and body 122 disposed between the two ends. Small end 118 has a general shape and size substantially identical to the end of the links of smaller chain 102 so it can be coupled with smaller link connecting component 108. Likewise, large end 120 has a general shape and size substantially identical to the end of the links of larger chain 106 so it can be coupled with larger link connecting component 112. Smaller end 118 and larger end 120 lie in the same plane. Each of smaller end 118 and larger end 120 provides an opening through which smaller link connecting component 108 and larger link component 112, respectively, passes, thereby connecting larger link connecting component 112 and the attached larger chain 106, with smaller link connecting component 108 and the attached smaller chain 102.

Referring to FIGS. 3A-3J, body 122 is generally rectangular and has a width that is generally the same as the width of the links of smaller chain 102. Referring to FIGS. 1-2, body 122 of dual link connecting component 110 preferably includes raised portions 124 on both sides. Referring to FIG. 2, the thickness of body 122 as measured from one raised portion 124 to the other raised portion 124 is preferably also about the same or slightly larger than the width of a link of smaller chain 102. Raised portion 124 is generally T-shaped with the top of the T toward large end 120 and the body of the T toward small end 18. Corners 134 on either the side of the T connecting the body of the T to the top of the T are preferably curved. As described in further detail below, corners 134 allow smaller link driving wheel 126 of chain wheel 100 to engage dual link connecting component 110.

In the preferred embodiment, body 122 has a length or pitch, i.e., the distance between small end 118 and large end 120, that is configured to allow smaller link driving wheel 126 to engage with corners 134 of dual link connecting component 110. The pitch is also dimensioned to maintain the engagement between a chain wheel pocket or wheel ledge (e.g. 128) of smaller link driving wheel 126 with the links of smaller chain 102 and deliver the links of larger chain 106 to the chain wheel pockets or wheel ledges (e.g., 136) for a proper engagement between the two. It is understood that the dimensions of the components of connecting link assembly 104 will vary accordingly depending on the size of the chains and corresponding chain wheels used.

Figure 3A:
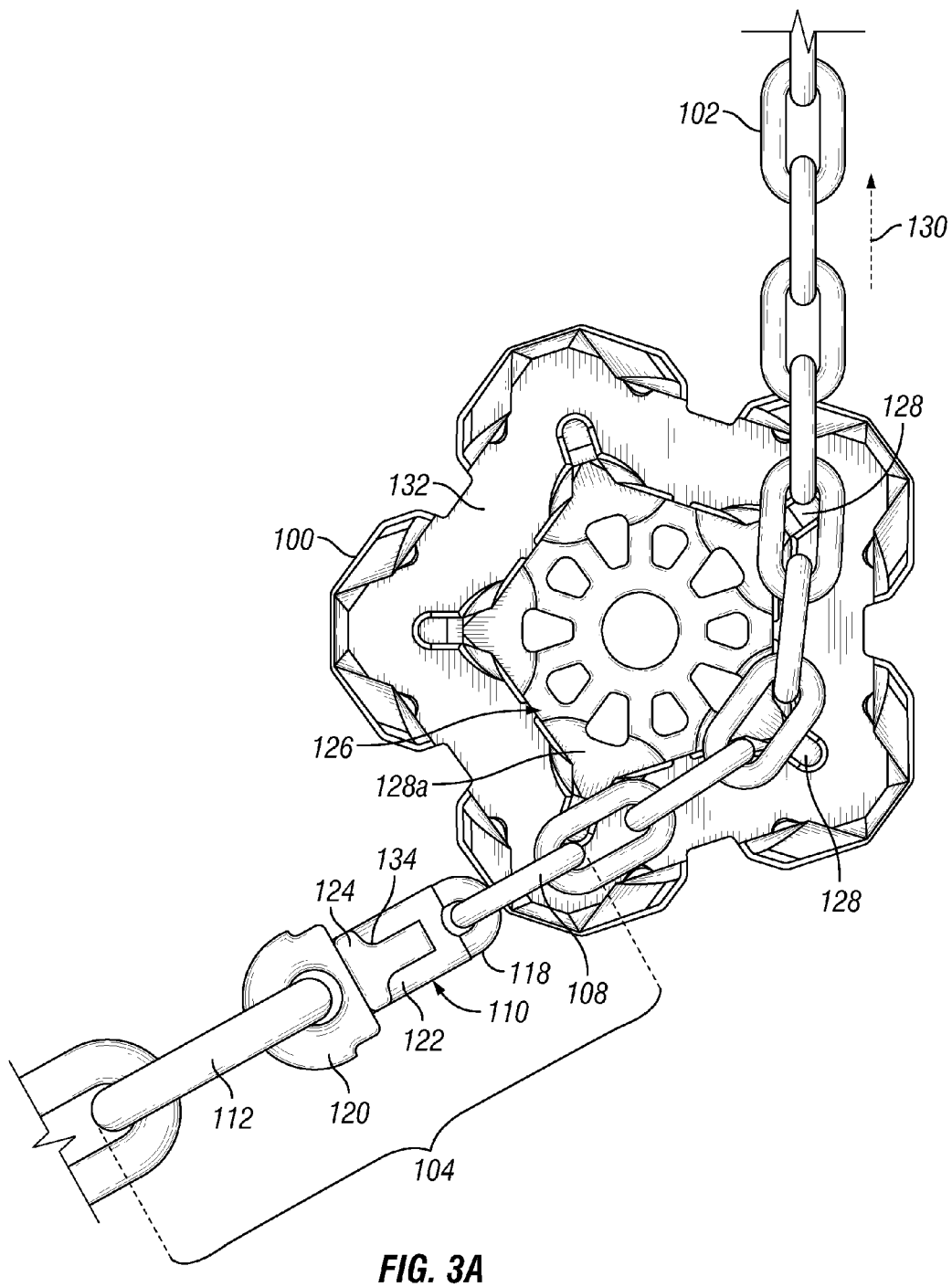
Figure 3B:
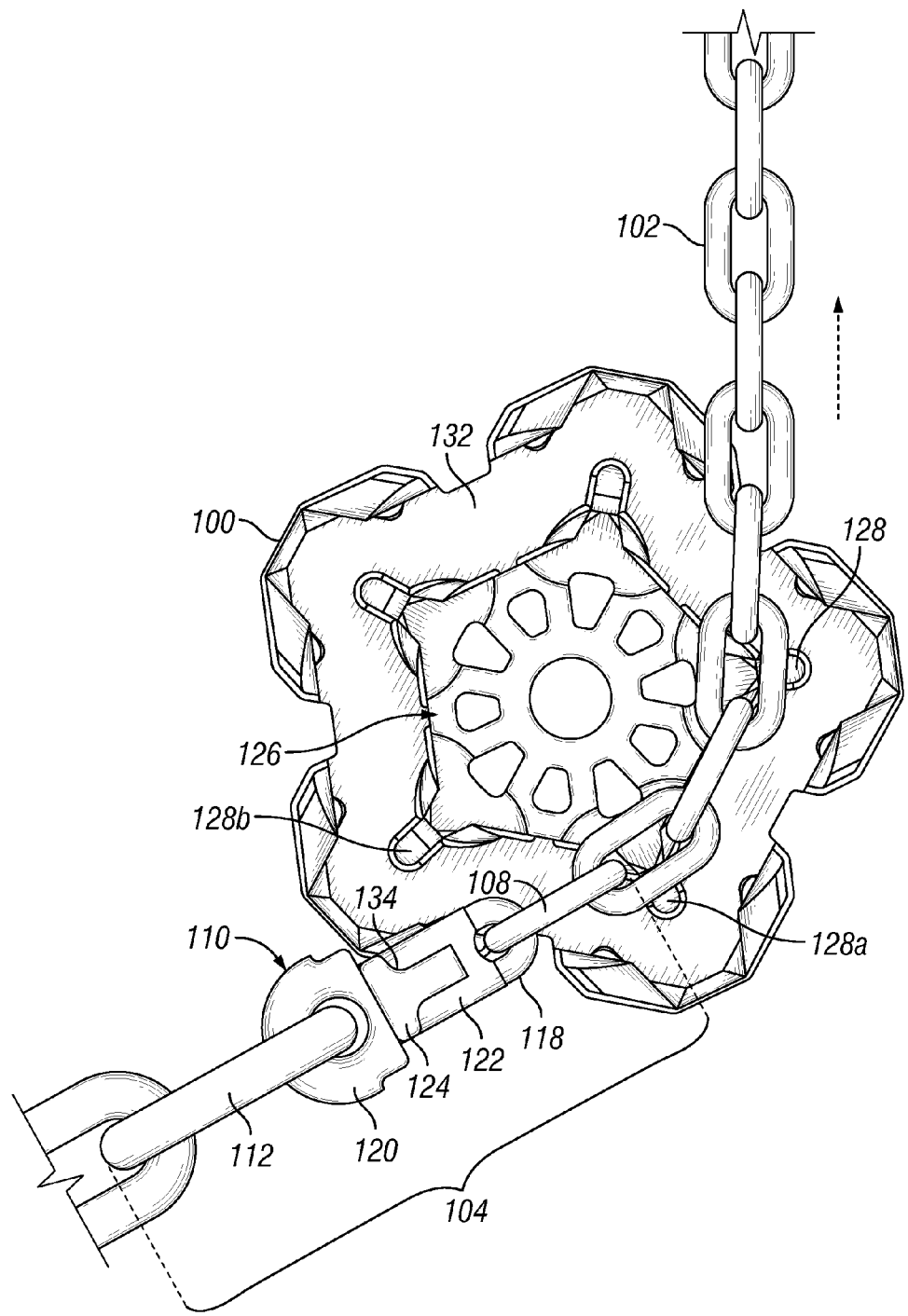
Figure 3C:
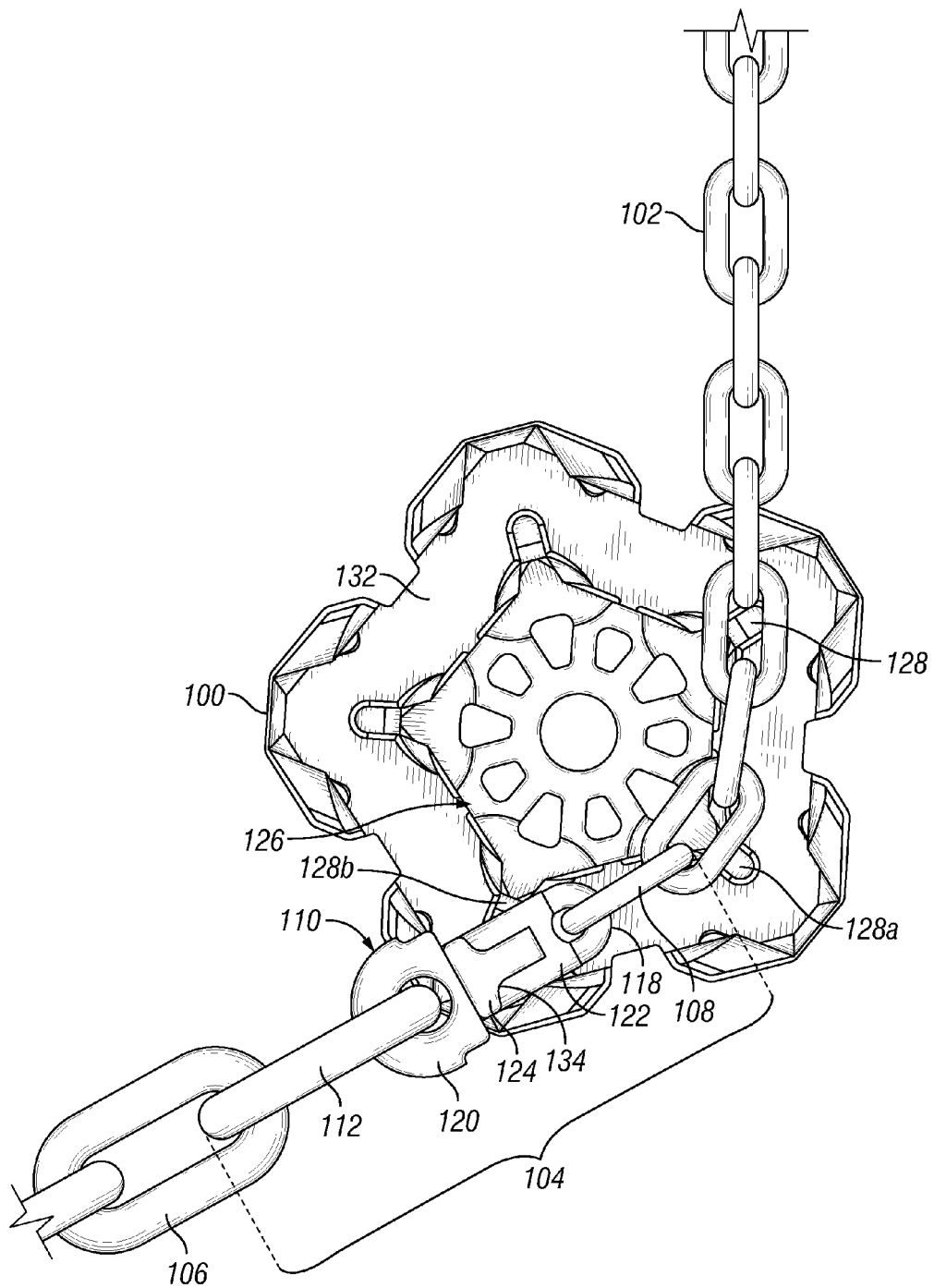

FIGS. 3A-3J illustrate the sequential movement of a chain assembly of connecting link assembly 104 connected to smaller chain 102 and larger chain 106 moving through chain wheel 100 where dual link connecting component 110 is parallel to the plane of wheel 100. Smaller link driving wheel 126 preferably includes a plurality of wheel ledges 128 that grip the links of smaller chain 102 as it moves through chain wheel 100 in the direction indicated by arrow 130. Referring to FIG. 3A, wheel ledge 128a engages smaller link connecting component 108. Referring to FIG. 3B, as smaller chain 102 moves through wheel 100, smaller link driving wheel 126 continues to rotate, thereby moving the subsequent wheel ledge, wheel ledge 128b, toward connecting link assembly 104. Referring to FIG. 3C, as smaller chain 102 continues to through wheel 100, wheel ledge 128b engages dual link connecting component 104, specifically at the T-body portion of raised portions 124 of body 122.

Figure 3D:
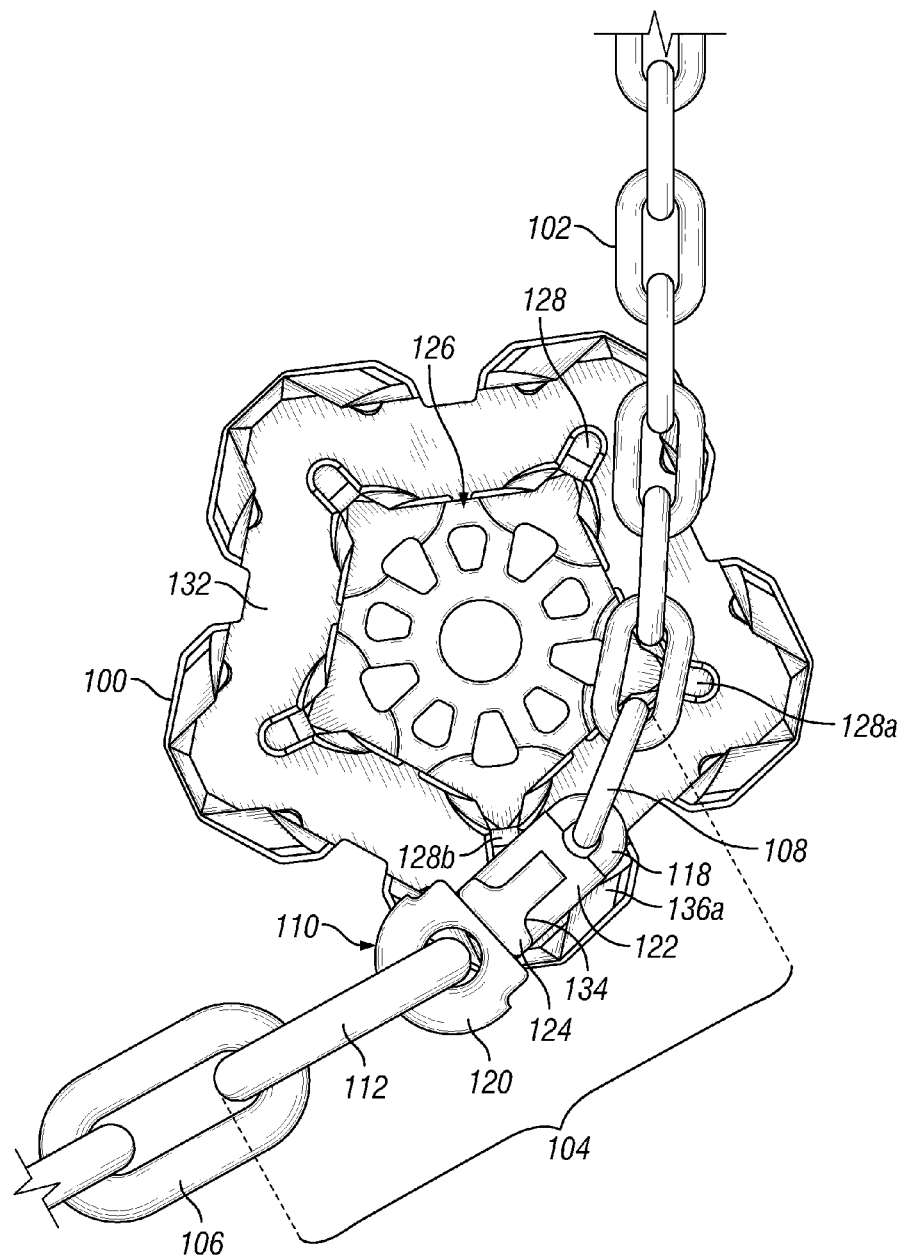
Figure 3E:
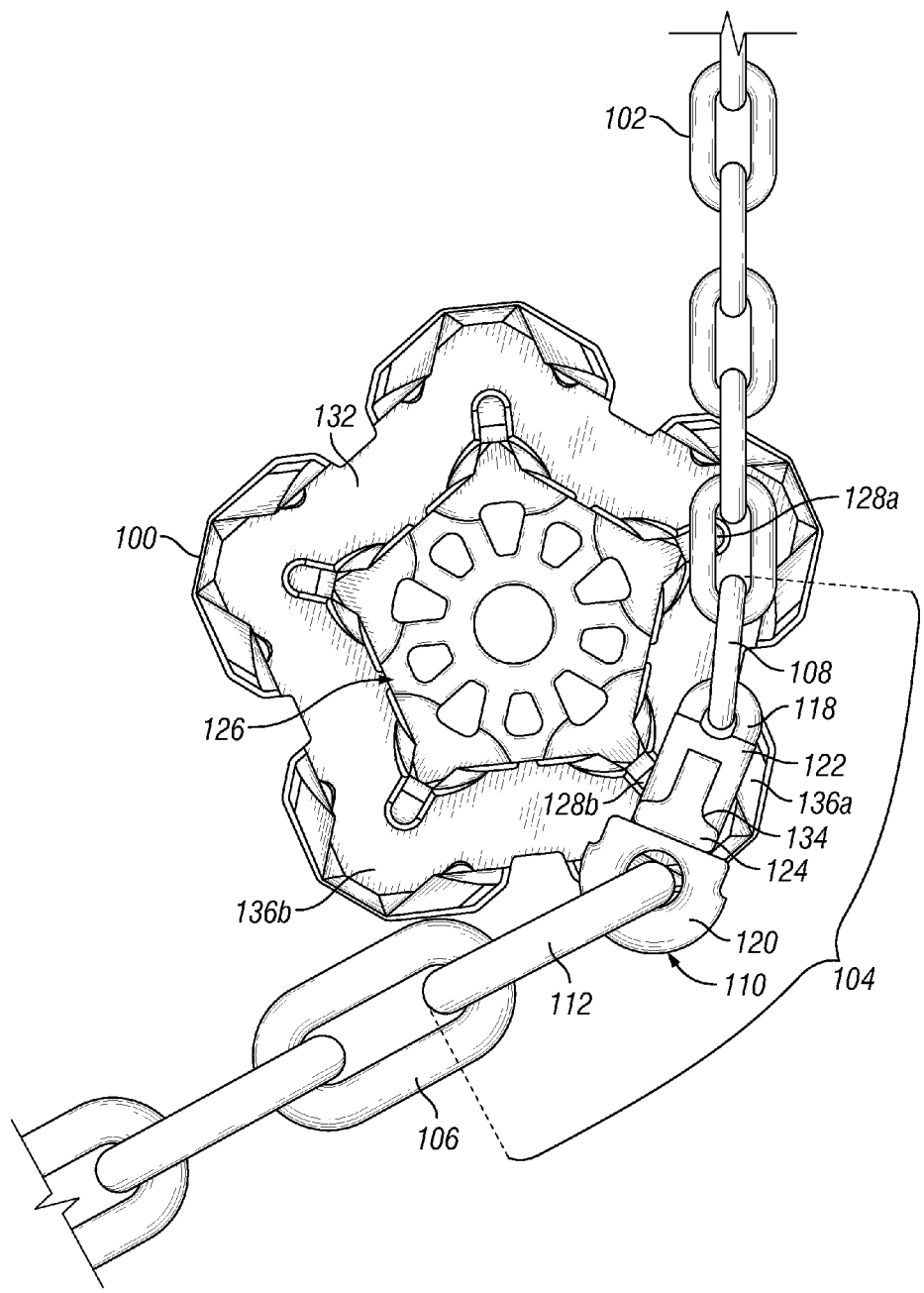
Figure 3F:
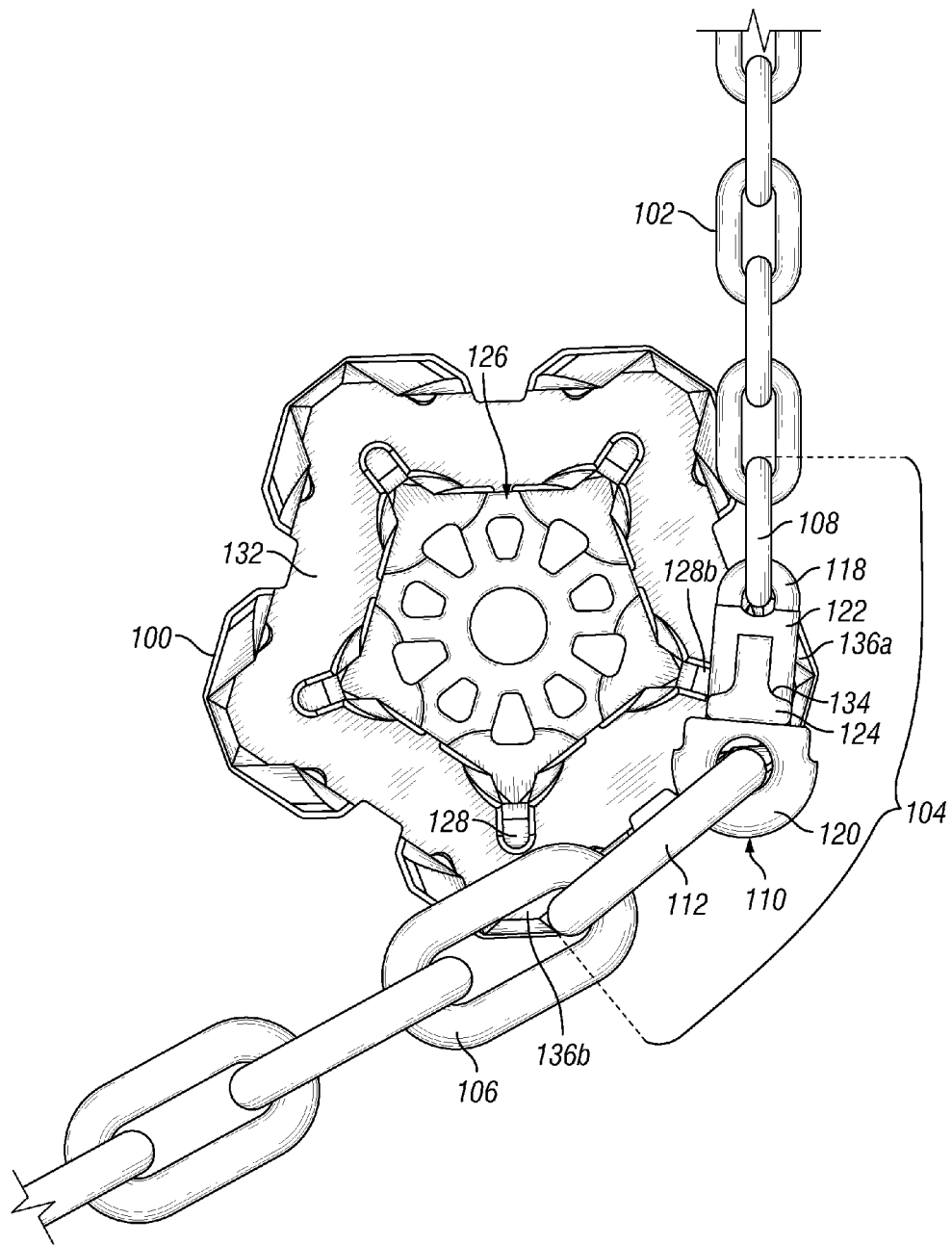
Figure 3G:
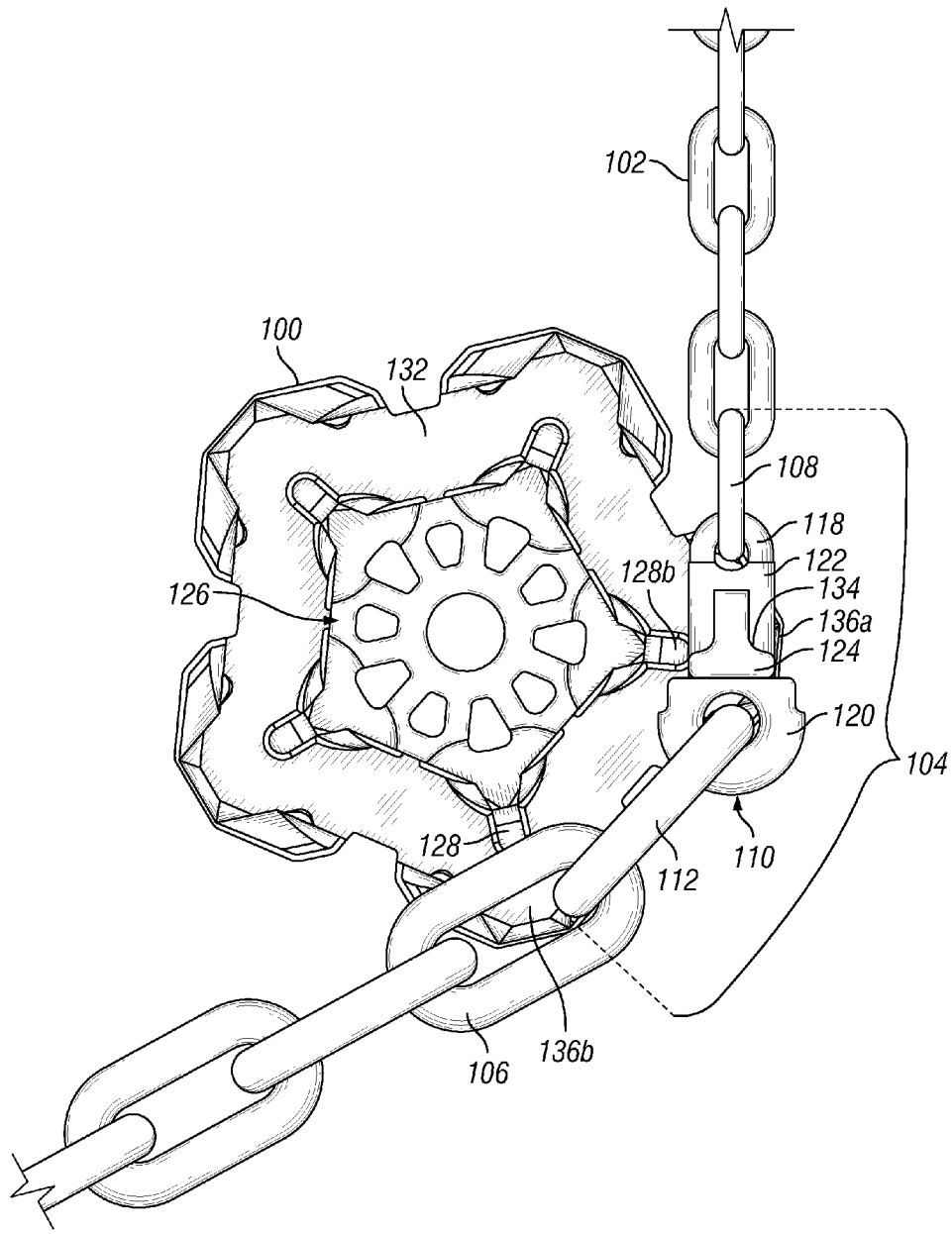
Figure 3H:
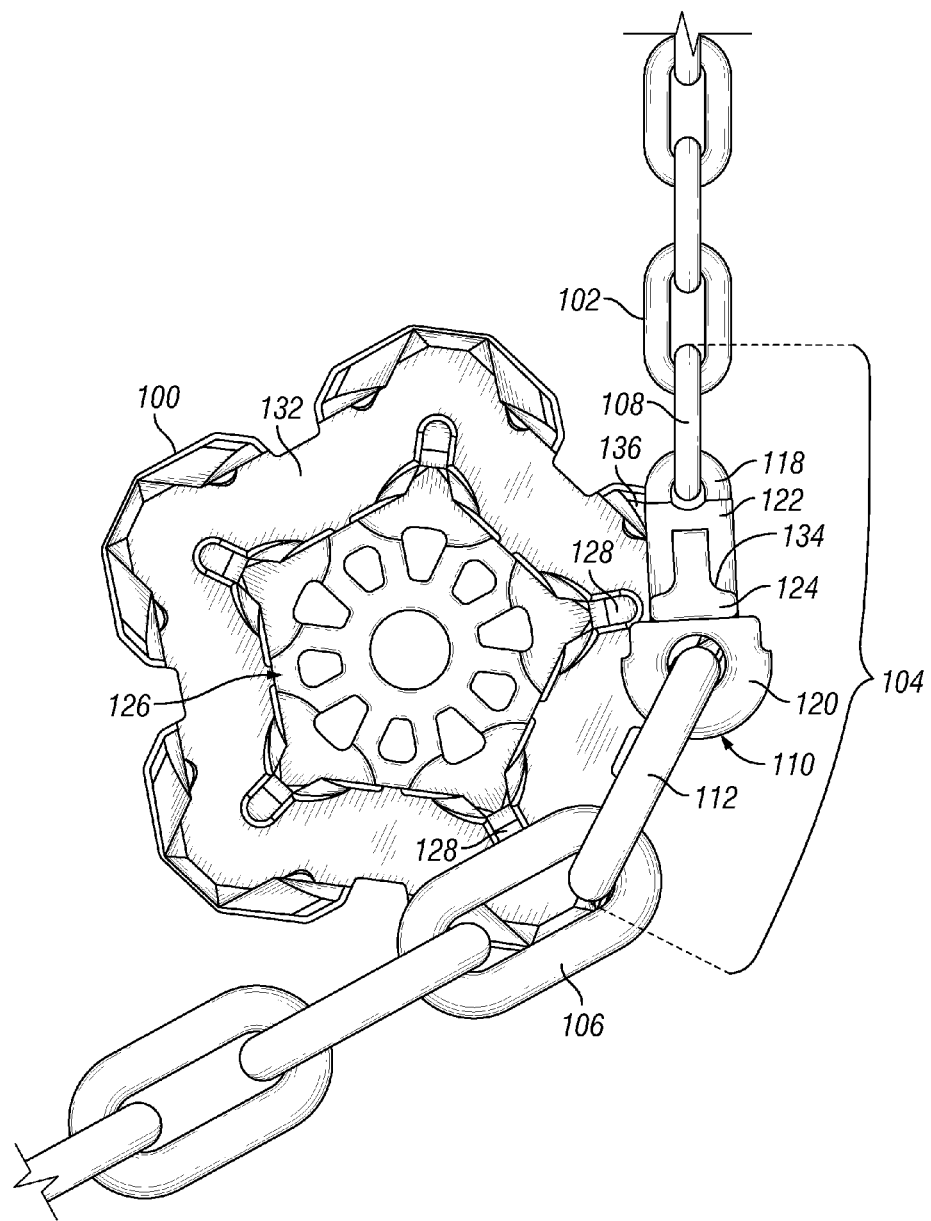
Figure 31:
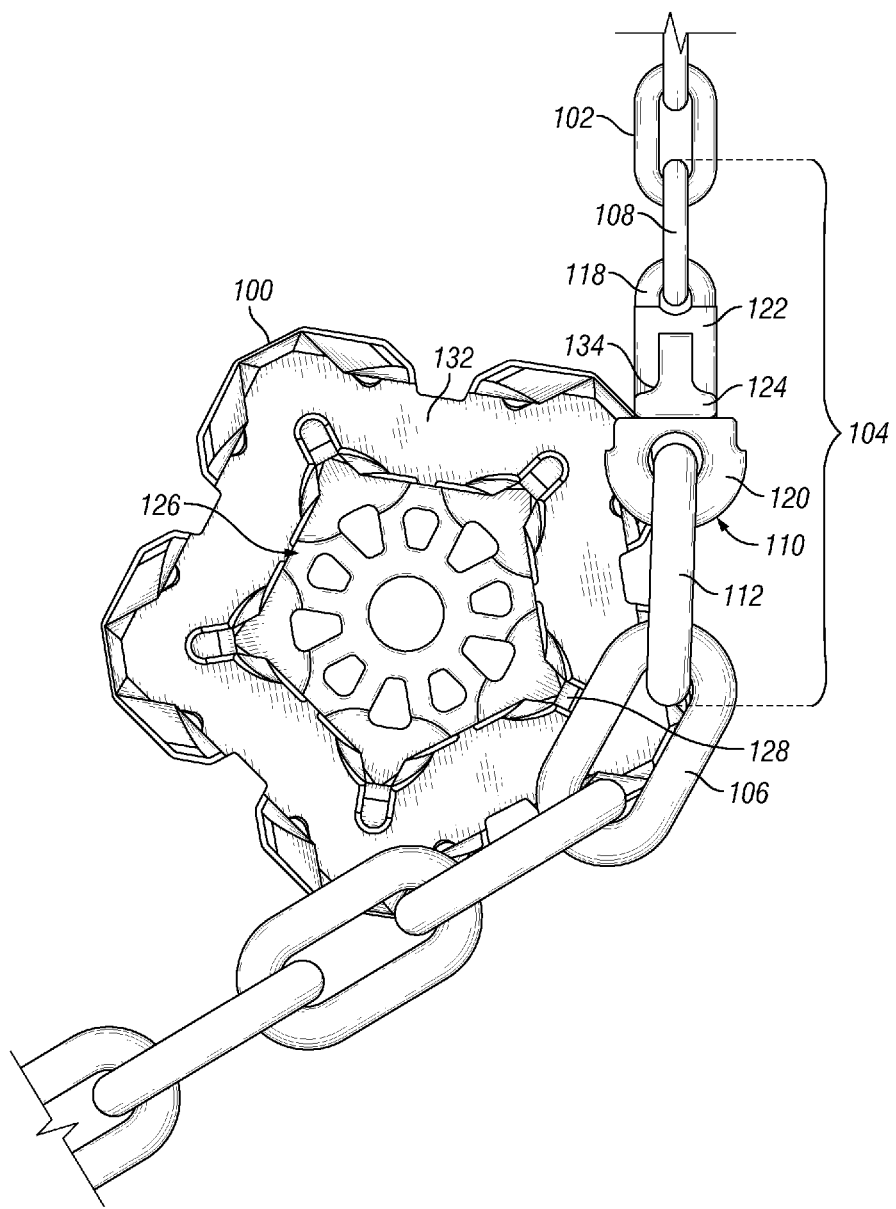
Figure 3J:
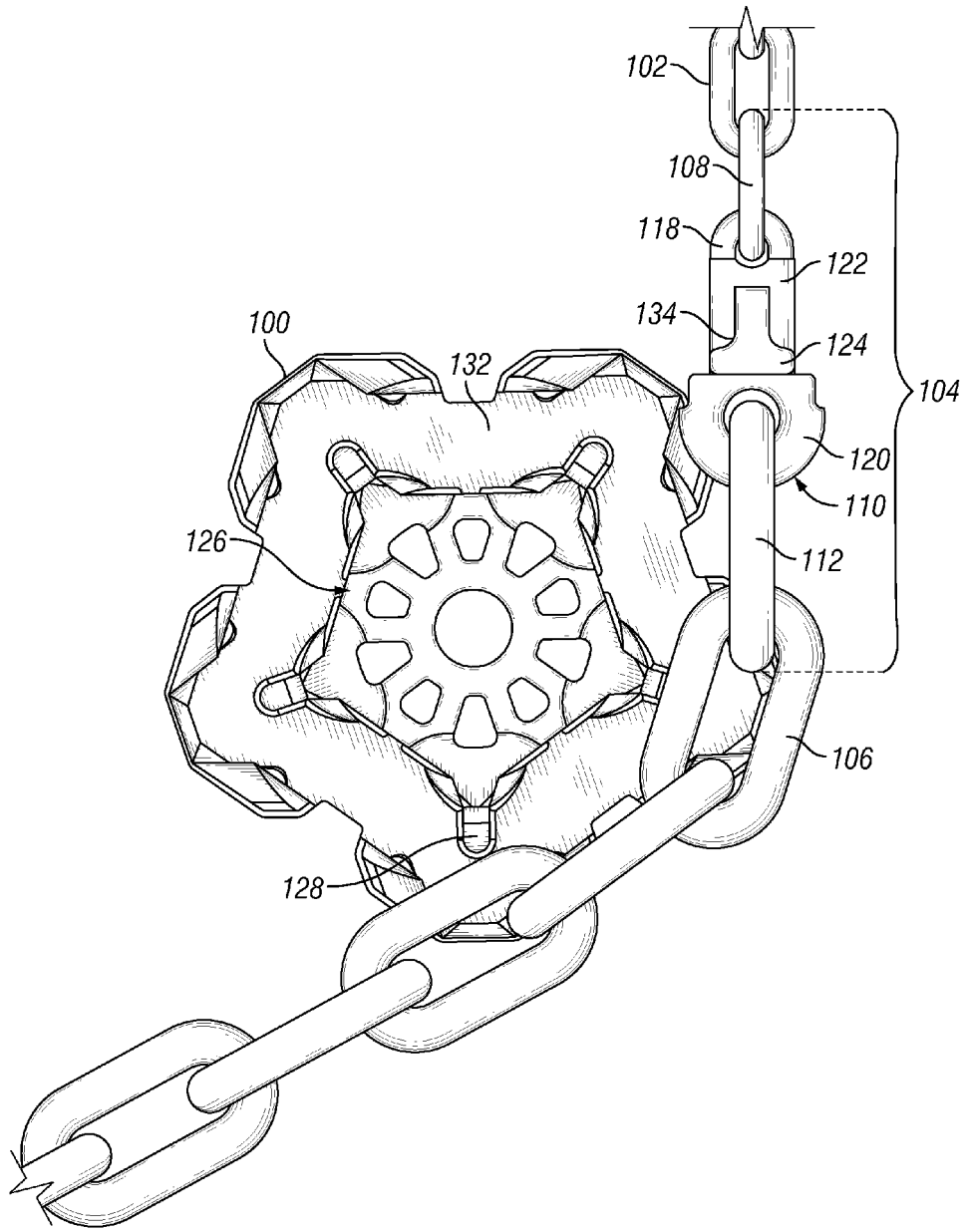
Figure 4:
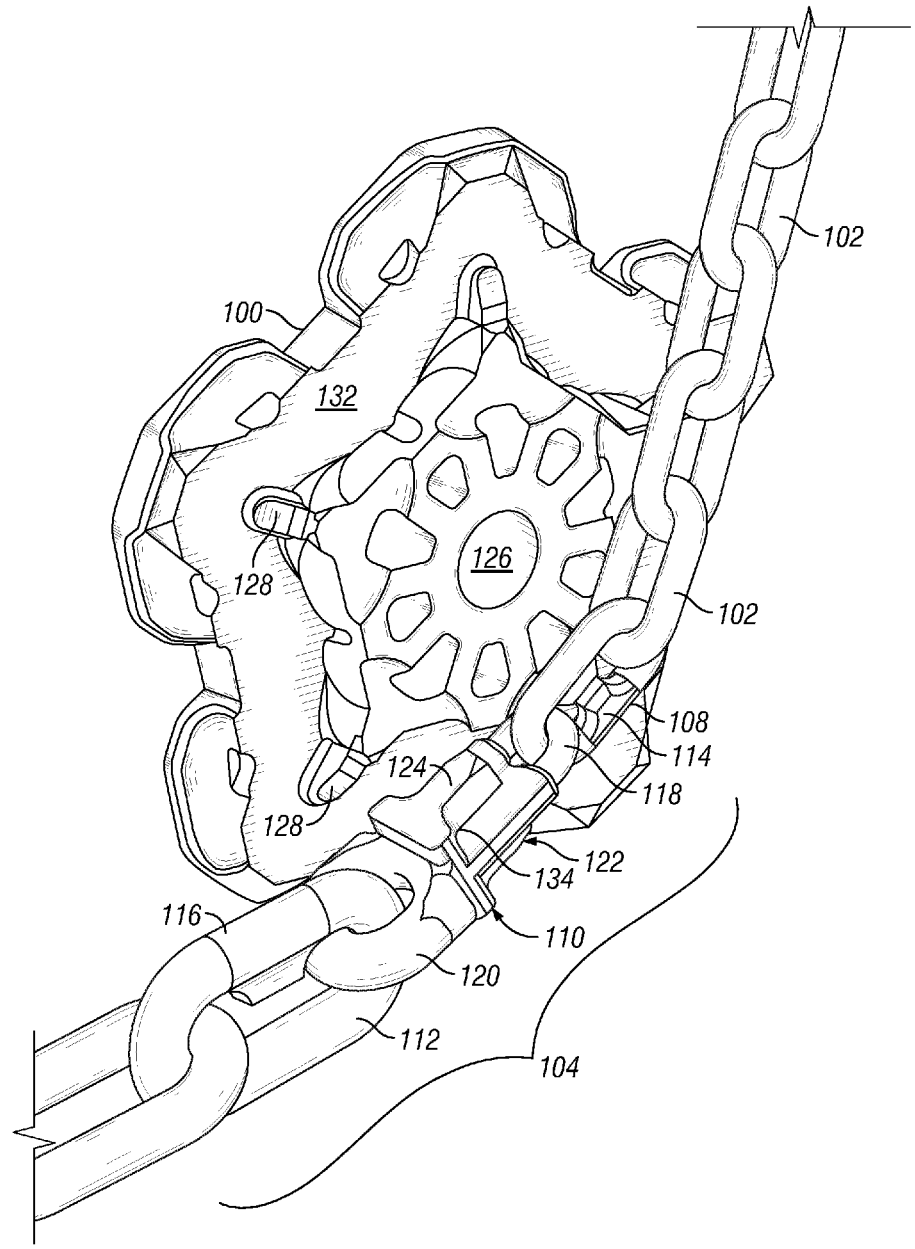
FIG. 4 is a perspective view of a second chain assembly (a second embodiment of a connecting link according to the aspects of the present disclosure coupled with the smaller chain and larger chain) engaged with a chain wheel.
Figure 5:
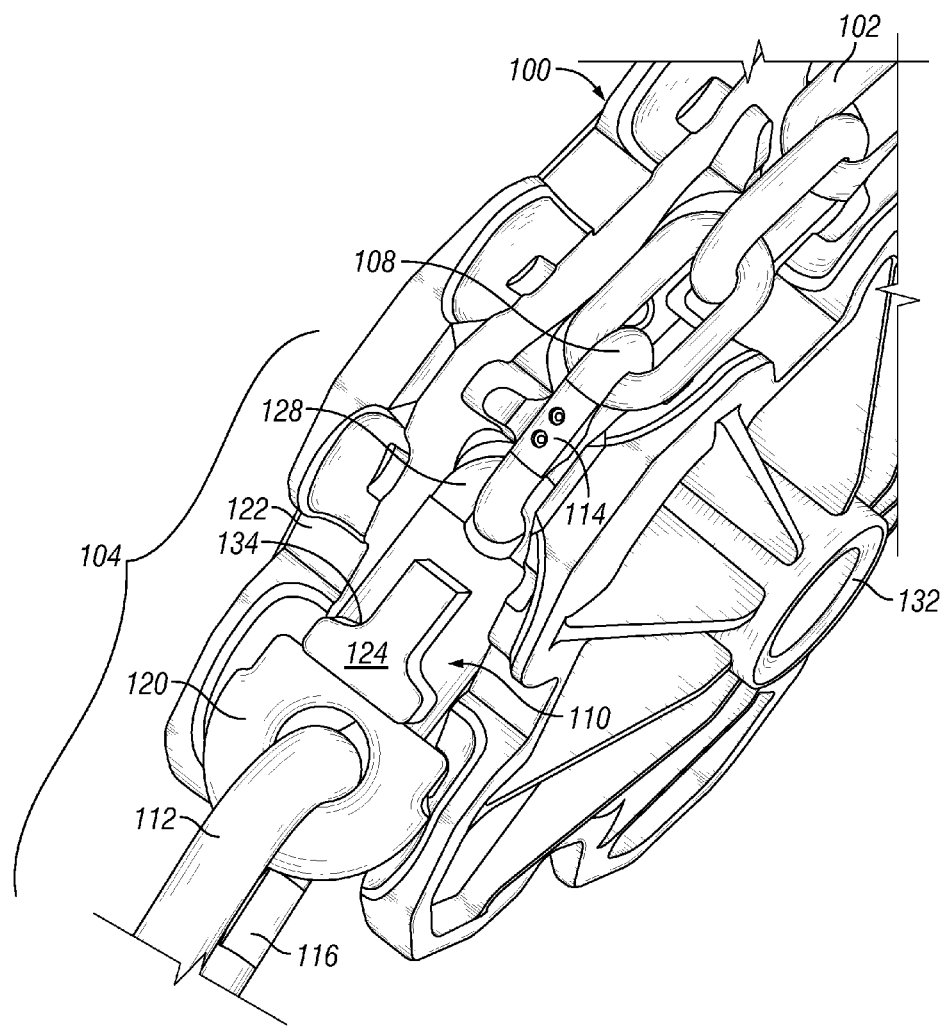
FIG. 5 is a top view of the second chain assembly of FIG. 4 (the second embodiment of the connecting link of the present disclosure coupled with the smaller chain and larger chain) engaged with a chain wheel.

Referring to FIG. 3D-3E, as smaller link driving wheel 126 continues to rotate, wheel ledge 128b moves into corners 134 of raised portions 124. At the same time, larger link connecting component 112 is placed in a position to engage wheel ledge 136a of larger link driving wheel 132. Referring to FIG. 3E, wheel ledge 128b slips into corners 134 of raised portions 124 as smaller link driving wheel 126 continues to rotate. Referring to FIG. 3F, wheel ledges 136a and 136b engage both ends of larger link connecting component 112 as the chain assembly moves through wheel 100. Wheel ledge 128b of smaller link driving wheel 126 still remains engaged with corners 134. Referring to FIG. 3G, as wheel ledge 136b begin to move toward the links of larger chain 106 to grip the next aligned link, wheel ledge 128b begins to slip away from corners 134 of connecting link assembly 104. Referring to FIGS. 3H-3J, larger link driving wheel 132 begins to fully engage and grip the links of larger chain 106 to move it through wheel 100 as smaller chain 102 and connecting link assembly 104 moves out of wheel 100.

Referring to FIGS. 4-6L, the elements and components of the chain assembly engaged with chain wheel 100 are substantially the same as described above, except dual link connecting component 110 is now perpendicular to the plane of wheel 100.

Figure 6A:
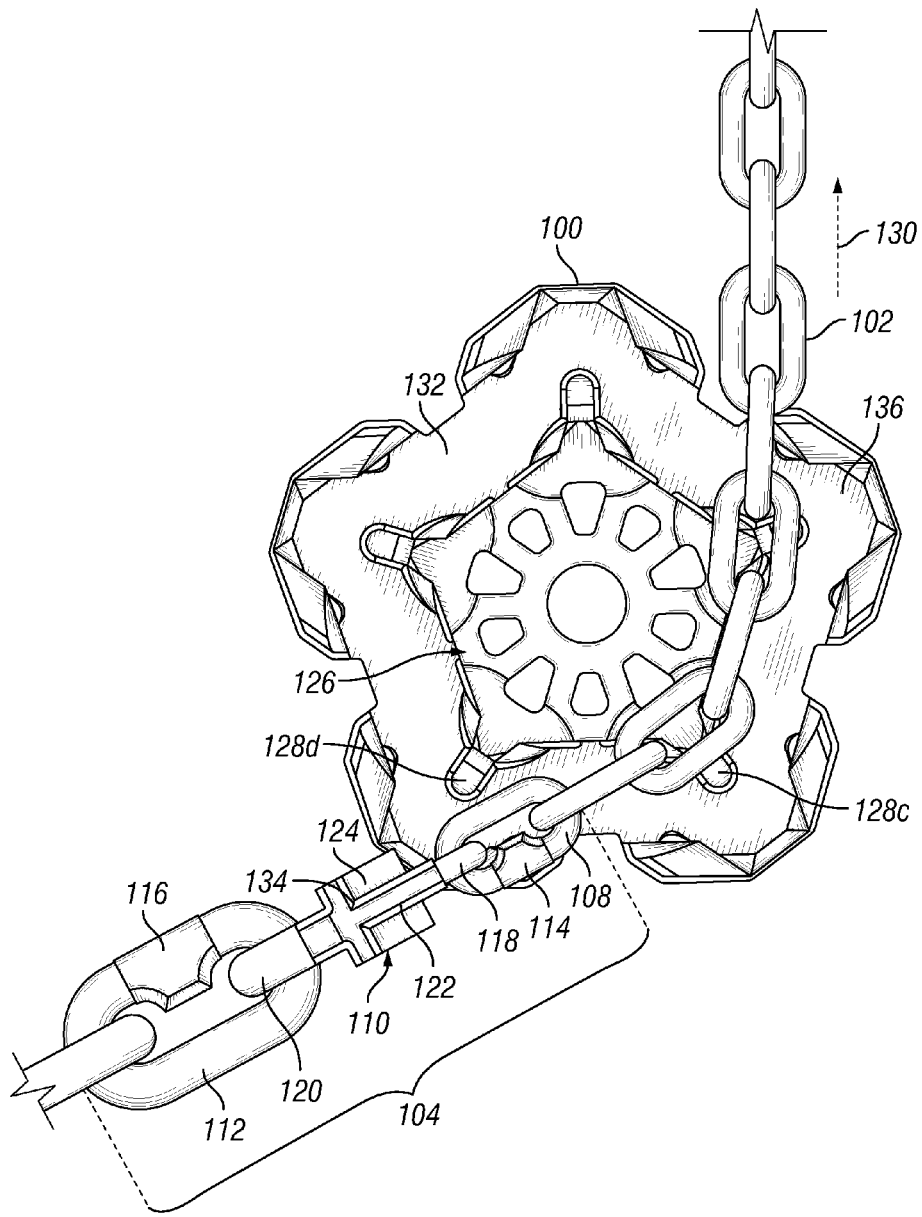
FIGS. 6A-6L show a side view of the sequential movement of the second chain assembly of FIG. 4 (the second embodiment of the connecting link of the present disclosure coupled with the smaller chain and larger chain) moving through a chain wheel.
Figure 6B:
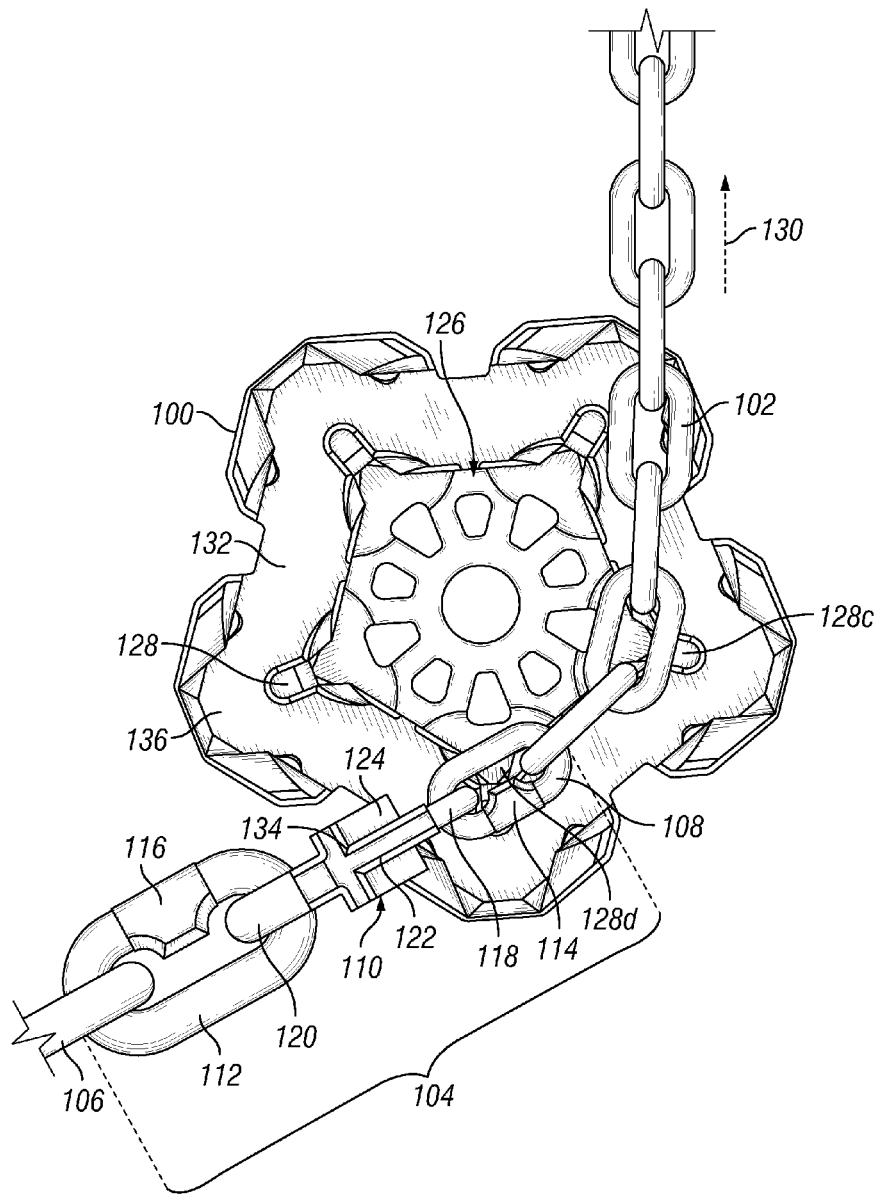
Figure 6C:
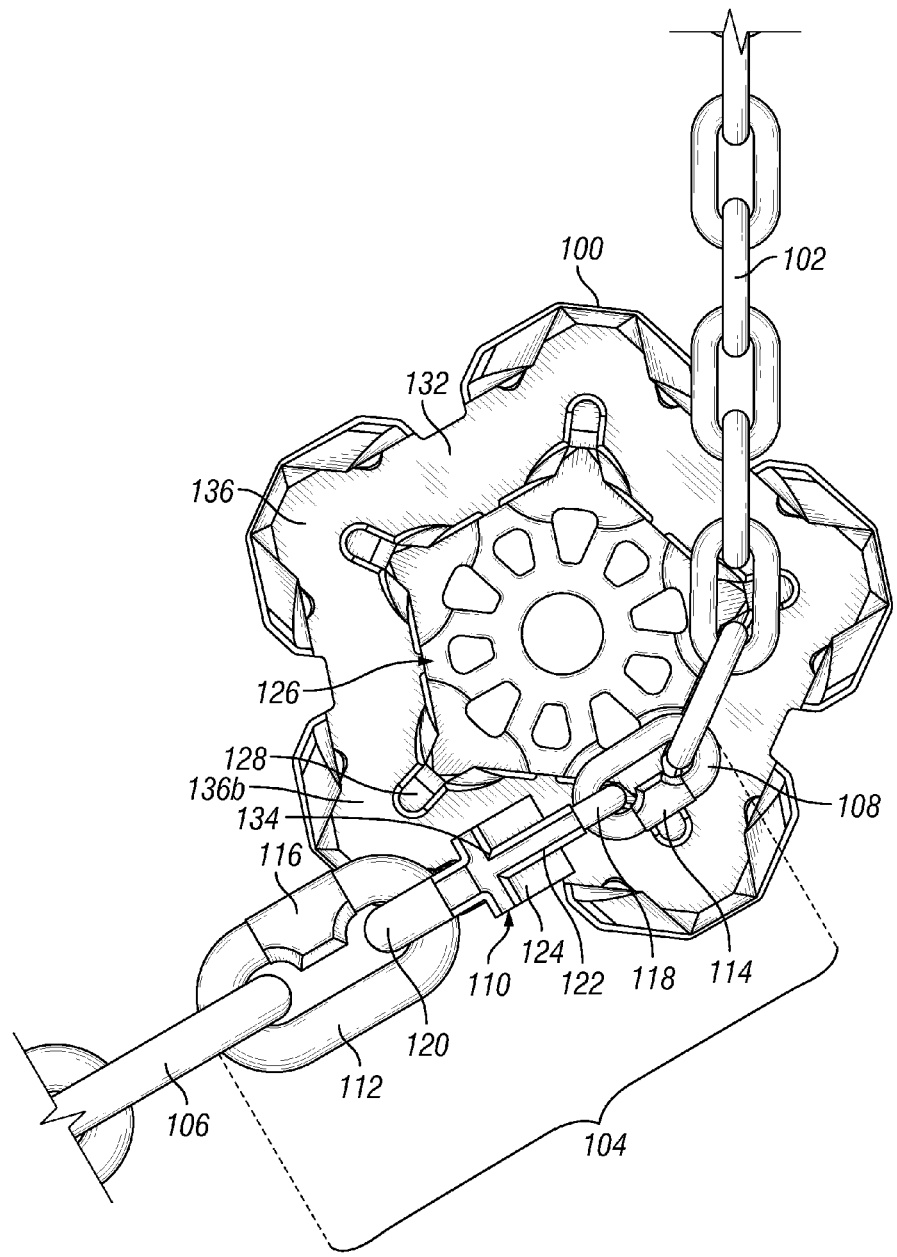

FIGS. 6A-6L illustrate the sequential movement of a chain assembly of connecting link assembly 104 connected to smaller chain 102 and larger chain 106 moving through chain wheel 100 where dual link connecting component 110 is perpendicular to the plane of wheel 100. Smaller link driving wheel 126 preferably includes a plurality of wheel ledge 128 that grips the links of smaller chain 102 as it moves through chain wheel 100 in the direction indicated by arrow 130. Referring to FIG. 6A, wheel ledge 128c engages smaller chain 102. Wheel ledge 128d is in position to engage smaller link connecting component 108. Referring to FIG. 6B, as smaller chain 102 moves through wheel 100, smaller link driving wheel 126 continues to rotate, thereby moving the subsequent wheel ledge, wheel ledge 128d, to fully engage smaller end 118 of connecting link assembly 104. Dual link connecting component 110, particularly larger end 120, is positioned to be trapped or engaged by larger link driving wheel 132. Referring to FIG. 6C, as smaller chain 102 continues to move through wheel 100, wheel ledge 136b of larger link driving wheel 132 engages dual link connecting component 110 at larger end 120.

Figure 6D:
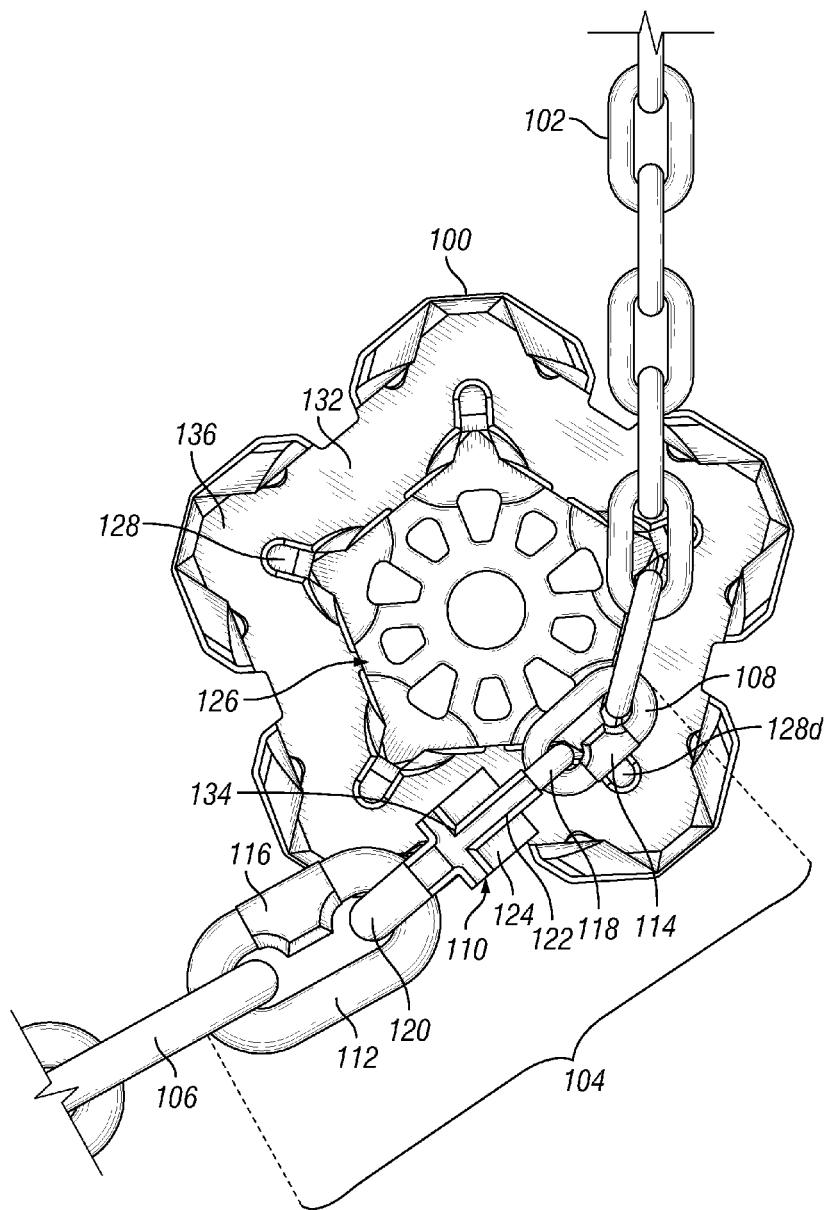
Figure 6E:
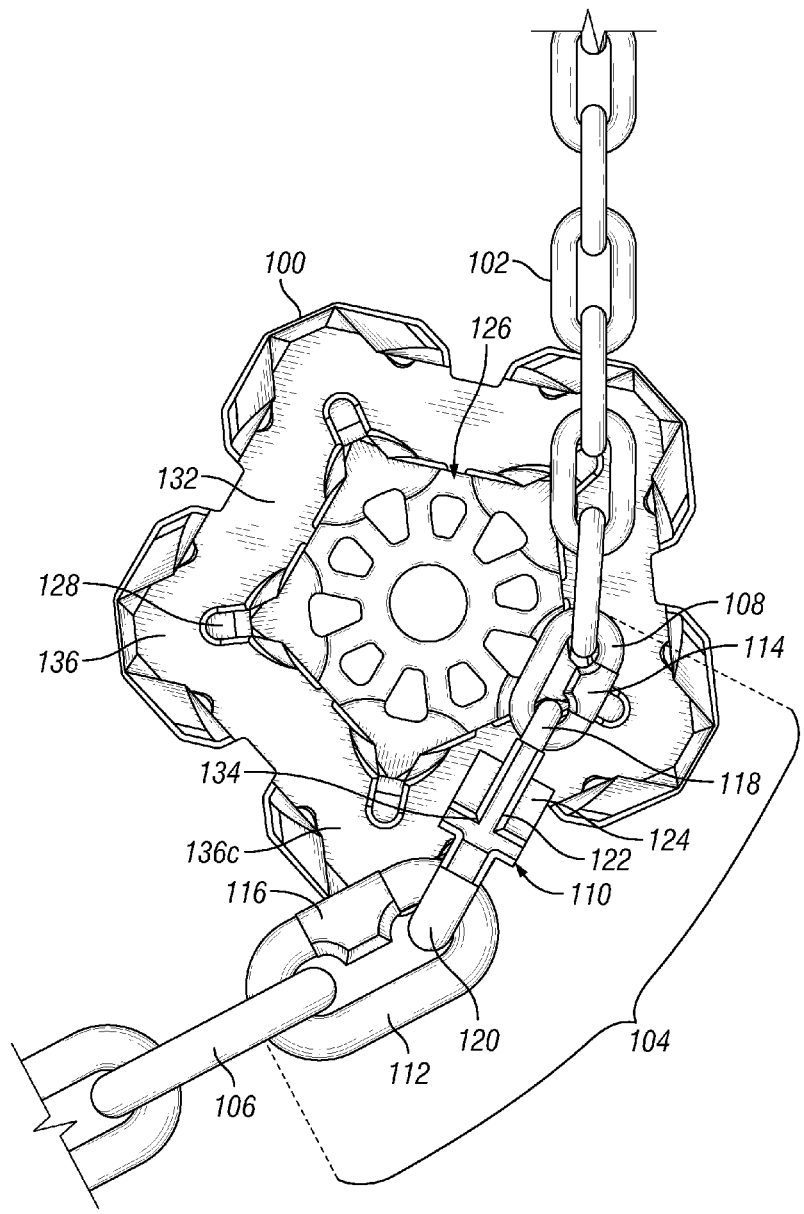
Figure 6F:
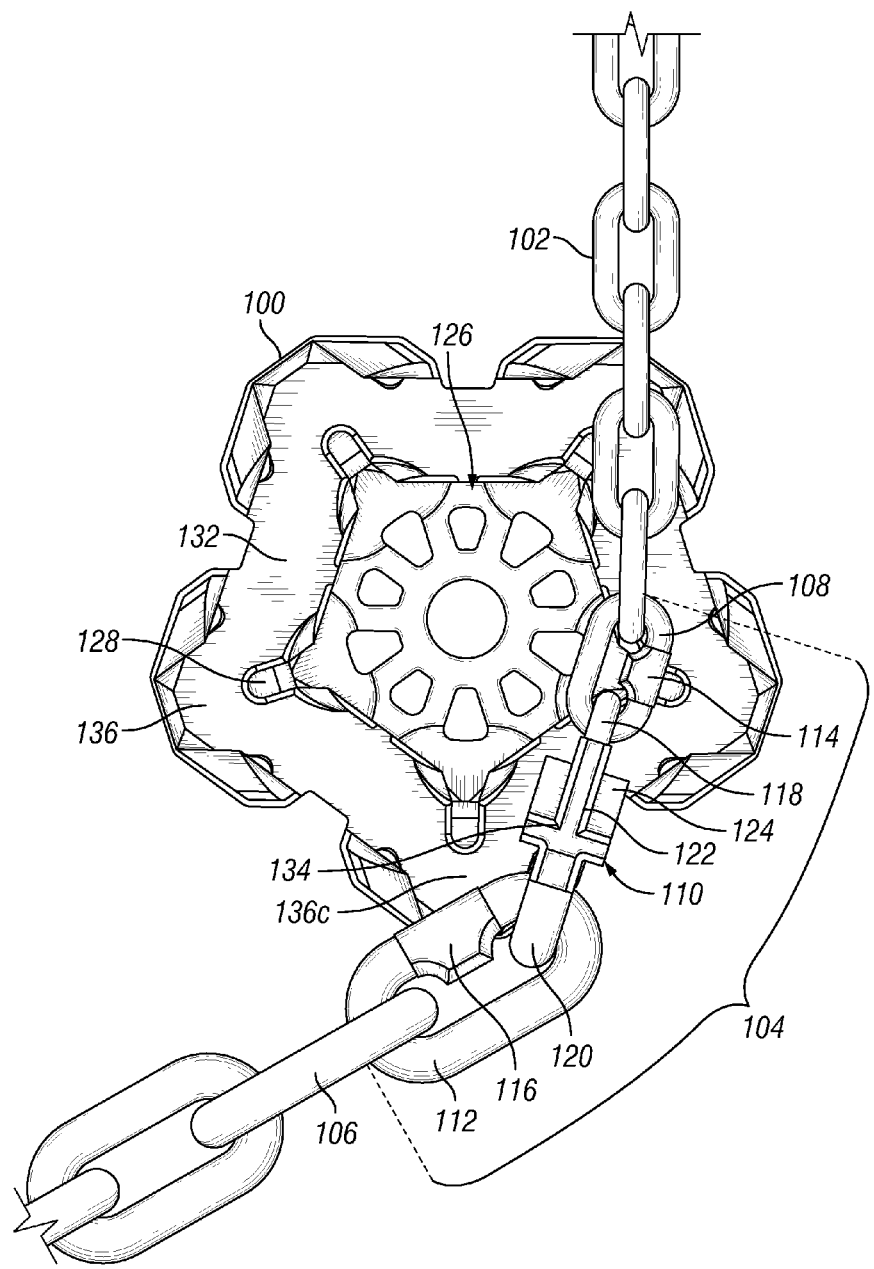
Figure 6G:
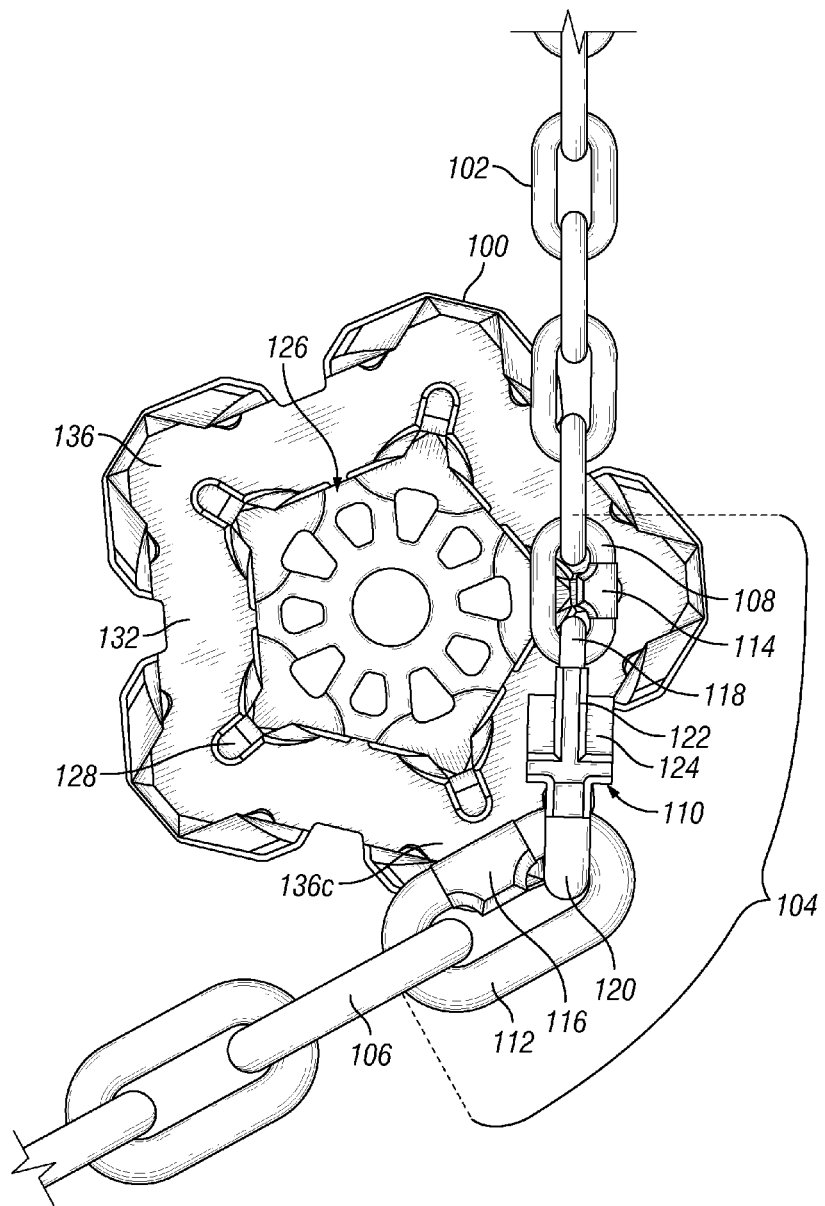
Figure 6H:
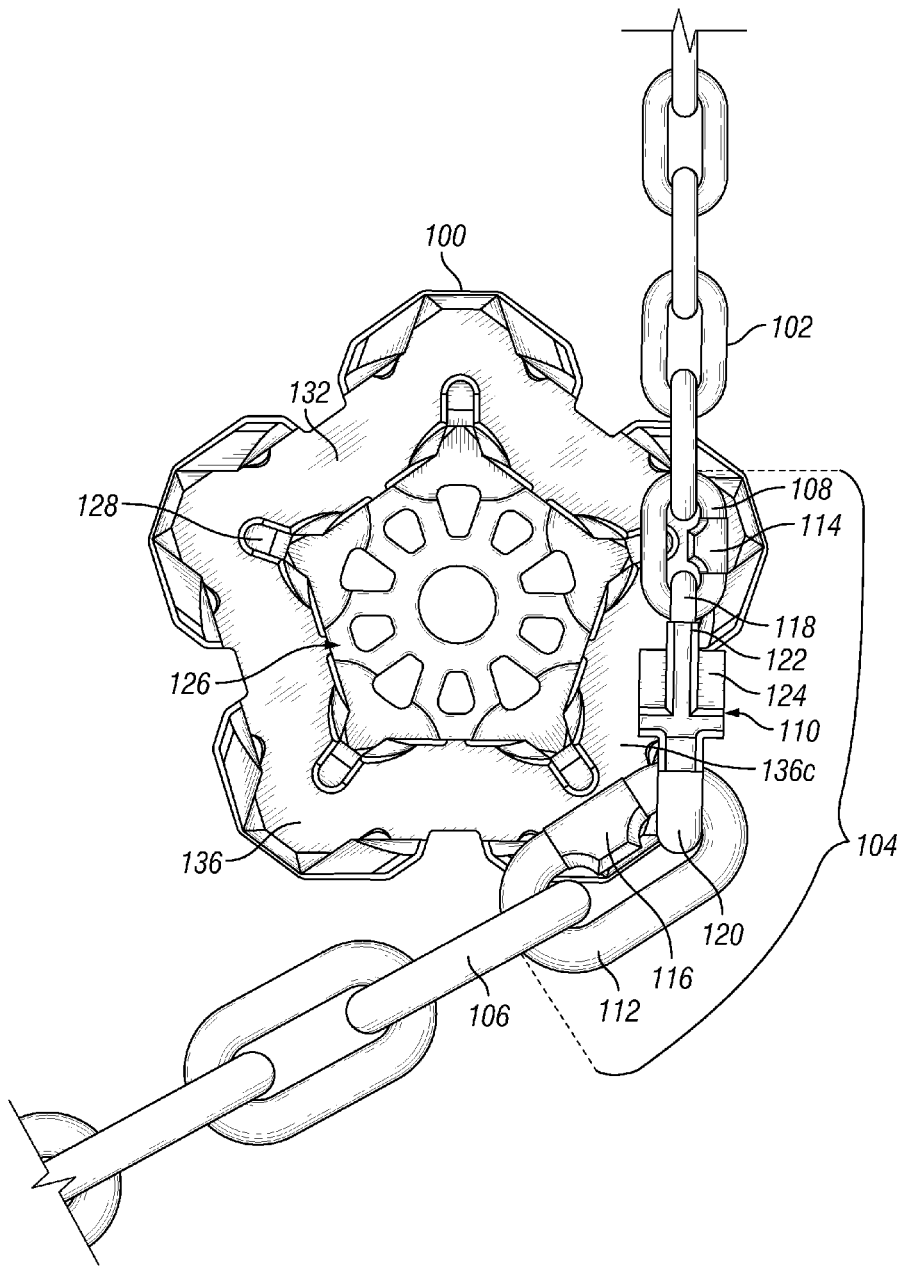
Figure 6I:
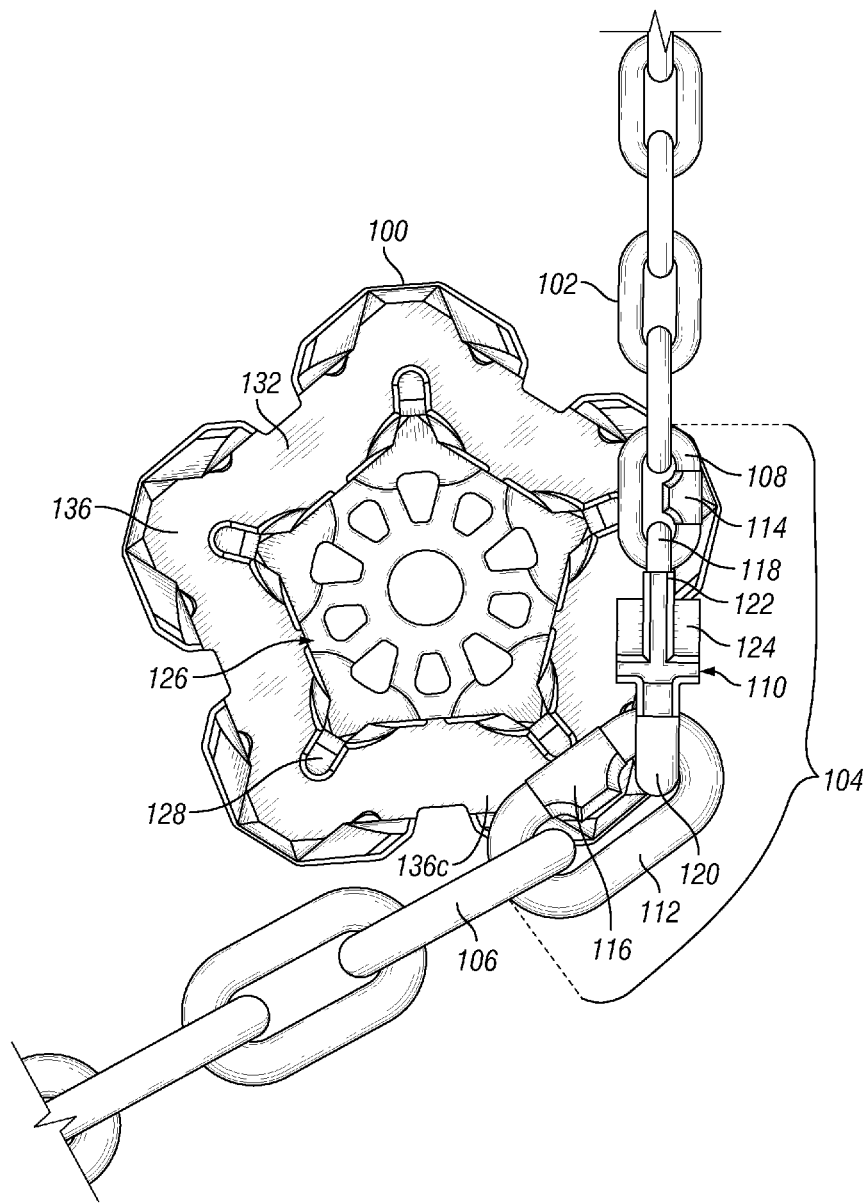

Referring to FIG. 6D, as smaller link driving wheel 126 continue to rotate, wheel ledge 136b fully engages and grips larger end 120. At this point there are two points of contact between wheel 100 and connecting link assembly 104: the first is between smaller end 118 and wheel ledge 128d of smaller link driving wheel 126 and the second is between larger end 120 and wheel ledge 136b of larger link driving wheel 132. Referring to FIGS. 6E-6F, as the chain assembly continues to move through wheel 100 the two points of contact continues to be maintained. Referring to FIG. 6G, larger link 106 is in position to be trapped or engaged with wheel ledges 136 of larger link driving wheel 132 as wheel 100 continues to rotate. Referring to FIGS. 6H-6I, wheel 100 begins to transition from engagement between smaller link driving wheel 126 with the chain assembly to engagement between larger link driving wheel 132 and the chain assembly as smaller chain 102 moves out of wheel 100 and larger link 106 enters wheel 100. As shown, dual link connecting 1047 begins to slip from wheel 100 and the link of larger chain 106 is positioned to be trapped or gripped by larger link driving wheel 132.

Figure 6J:
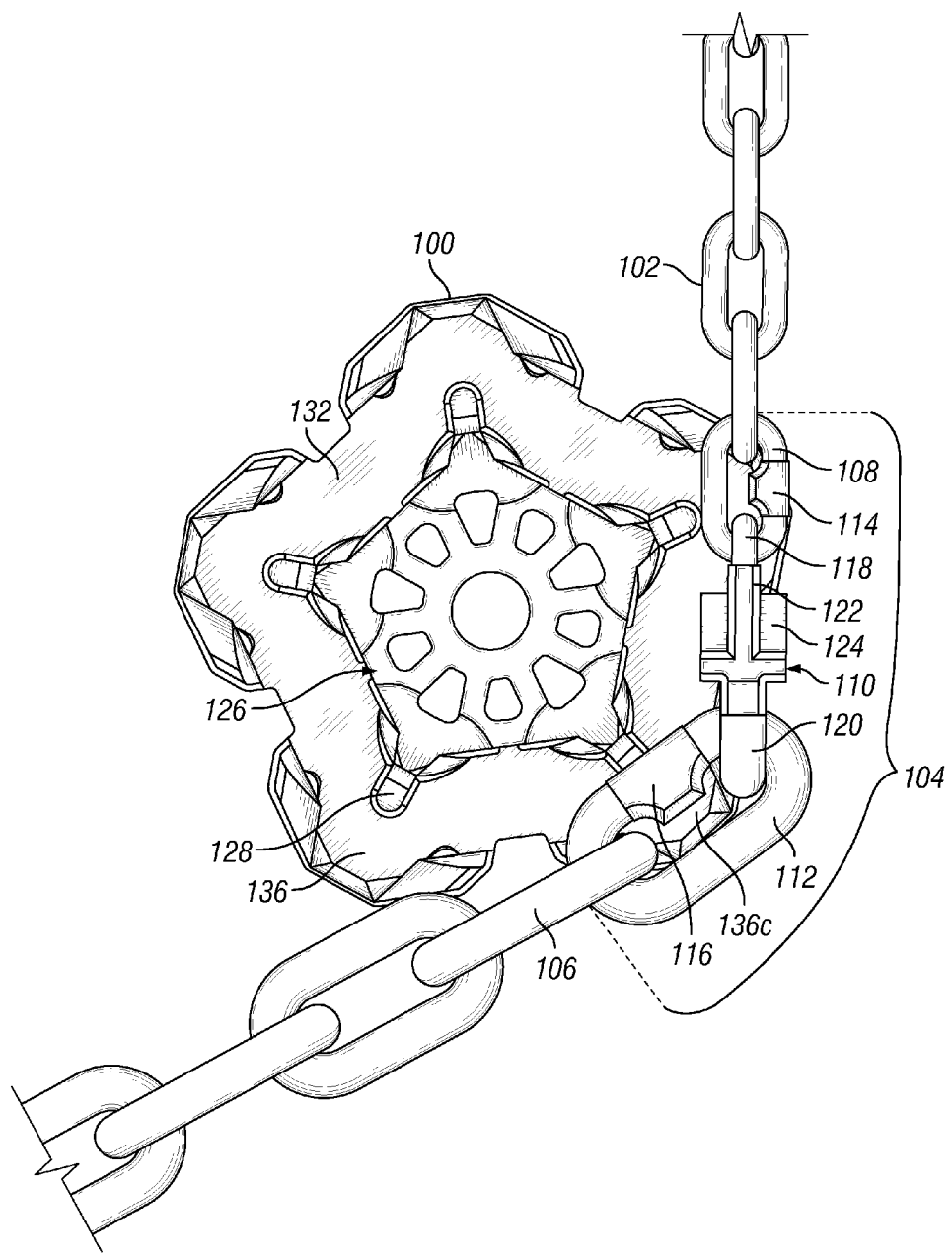
Figure 6K:
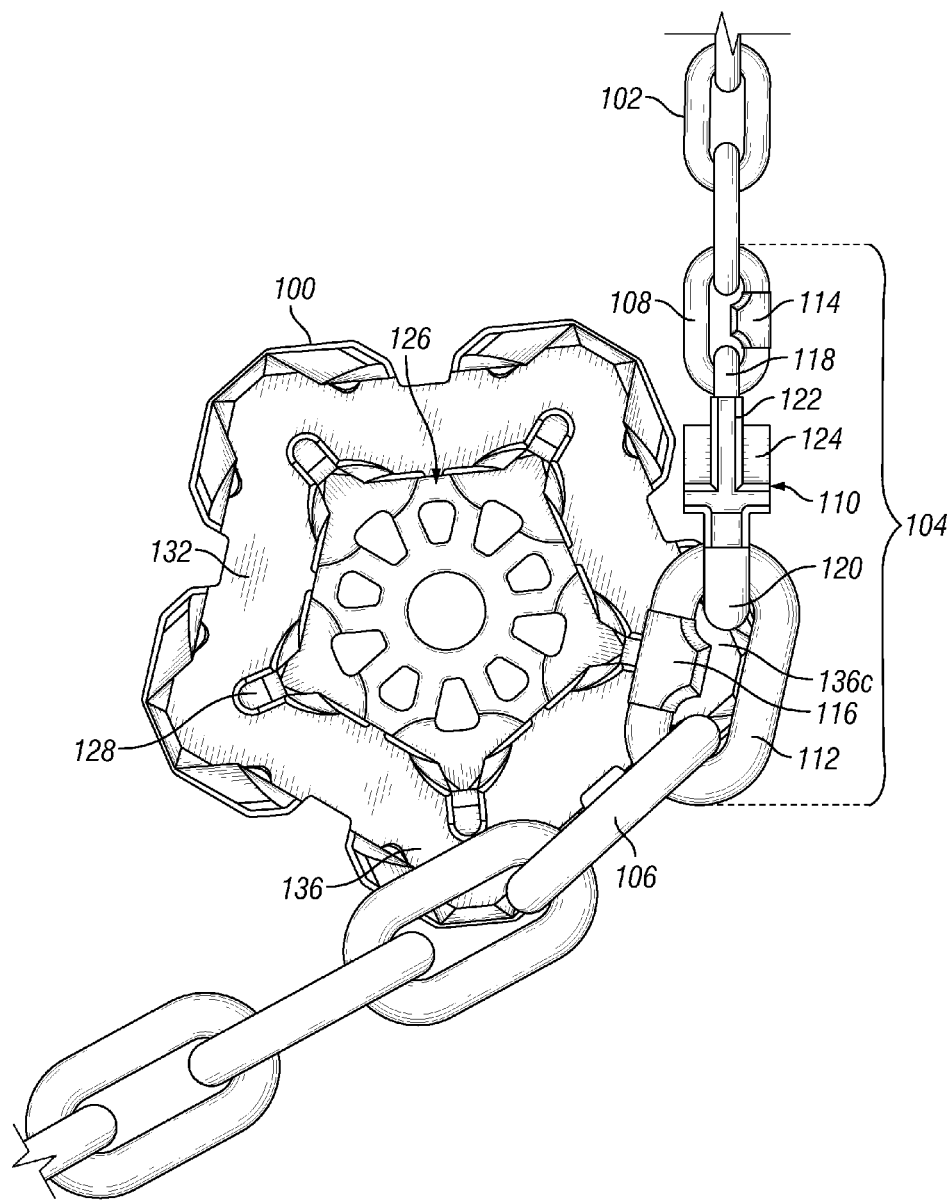
Figure 6L:
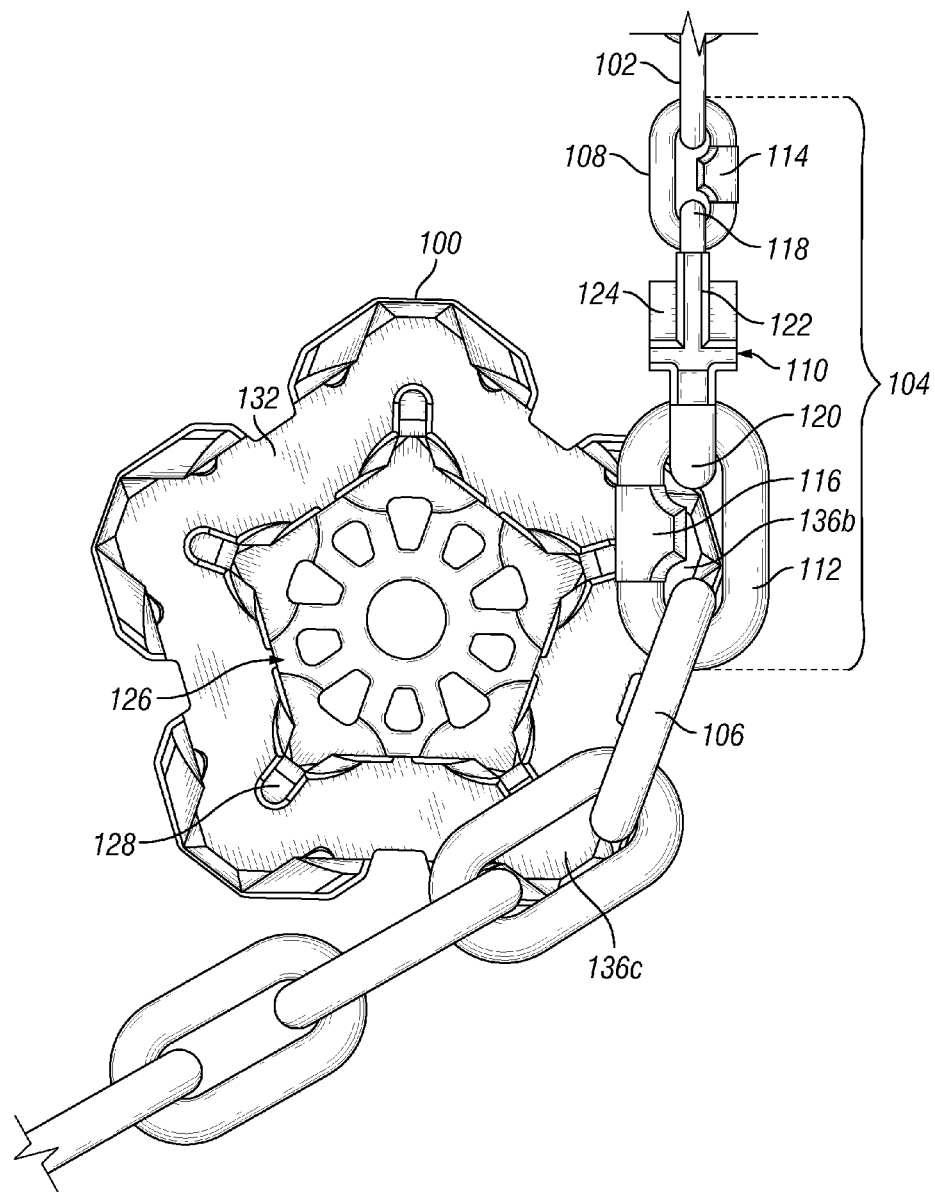

Referring to FIG. 6J, as wheel 100 continues to rotate, wheel edge 136b fully engages with the end link of larger chain 106. FIGS. 6K-6L show smaller chain 102 and connecting link assembly 104 moving out of wheel 100 and larger link driving wheel 132 taking over to move larger chain 106 through wheel 100.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A connecting link assembly comprising:
a first releasable chain link sized according to a first chain size;
a second releasable chain link sized according to a second chain size;
a connecting component configured to be connected to said first releasable chain link and said second releasable chain link and comprising a raised portion shaped to engage a chain wheel.

2. The connecting link assembly of claim 1, wherein the raised portion of said connecting component is T-shaped.

3. The connecting link assembly of claim 1, wherein the raised portion comprises corners configured to engage a small chain wheel of a dual chain wheel.

4. The connecting link assembly of claim 1, wherein the corners of said raised portion are rounded.

5. The connecting link assembly of claim 1, wherein said first releasable line is larger than said second releasable link.

6. The connecting link assembly of claim 1, wherein said connecting component further comprises a body connected to said first releasable chain link and said second releasable chain link.

7. The connecting link assembly of claim 6, wherein said body has a width that is approximately the same size as the width of said first releasable chain link.

8. The connecting link assembly of claim 7, wherein said body has a thickness that is approximately the same size as width of said first releasable chain link.

9. The connecting link assembly of claim 6, wherein said body has a pitch sized to allow a first chain size to engage a small chain wheel and a second chain size to engage a large chain wheel of a dual chain wheel.

10. The connecting link assembly of claim 1, wherein said connecting component further comprises a second raised portion.

11. A connecting link comprising:
a body with a first side and a second side;
a first raised portion shaped to engage a chain wheel, said first raised portion positioned on the first side of said body;
a second raised portion positioned on the second side of said body; and
a first end connected to said body; and
a second end connected to said body.

12. The connecting link of claim 11, wherein the second raised portion is shaped to engage a chain wheel.

13. The connecting link of claim 11, wherein the first raised portion is T-shaped.

14. The connecting link of claim 11, wherein said first end is sized according to a first chain size and said second end is sized according to a second chain size.

15. The connecting link of claim 11, wherein said body has a length sized according to a small chain wheel and a large chain wheel of a dual chain wheel.

16. The connecting link of claim 11, further comprising a first releasable chain link connected to said first end and a second releasable chain link connected to second end.

17. The connecting link of claim 16, wherein said first releasable chain link is the same size as a link in a first chain size.

18. The connecting link of claim 16, wherein said first releasable chain link and said second releasable chain link are aligned.

19. The connecting link of claim 16, wherein said first releasable chain link comprises a chain link body and a release mechanism, wherein said release mechanism comprises a first and second half.

20. The connecting link of claim 19, wherein said release mechanism is shaped to prevent said first end from engaging the first link of the first chain size.

* * * * *